United States Patent [19]

Bouton et al.

[11] 3,873,974

[45] Mar. 25, 1975

[54] SCANNING SYSTEM FOR LOCATION AND CLASSIFICATION OF PATTERNS

[75] Inventors: John C. Bouton, Doylestown; Melvin E. Partin, Newtown Square, both of Pa.

[73] Assignee: Geometric Data Corporation, Wayne, Pa.

[22] Filed: Oct. 12, 1973

[21] Appl. No.: 406,071

[52] U.S. Cl. ................ 340/146.3 AC, 340/146.3 B, 340/146.3 H

[51] Int. Cl. ................ G06k 9/04

[58] Field of Search ......... 340/146.3 AC, 146.3 SG, 340/146.3 D, 146.3 R, 146.3 Y; 235/92 PC; 356/39; 178/DIG. 36

[56] References Cited

UNITED STATES PATENTS

| | | | |
|---|---|---|---|
| 3,315,229 | 4/1967 | Smithline | 235/92 PC |
| 3,497,690 | 2/1970 | Wheeless, Jr. et al. | 356/39 |
| 3,501,623 | 3/1970 | Robinson | 340/146.3 D |
| 3,526,876 | 9/1970 | Baumgartner et al. | 340/146.3 SG |
| 3,714,372 | 1/1973 | Rosen et al. | 178/DIG. 36 |
| 3,795,792 | 3/1974 | Gibbons et al. | 235/92 PC |

*Primary Examiner*—Gareth D. Shaw
*Assistant Examiner*—Leo H. Boudreau
*Attorney, Agent, or Firm*—Caesar, Rivise, Bernstein & Cohen

[57] ABSTRACT

A blood cell classification system for locating and classifying white blood cells in a peripheral blood smear is disclosed. The system utilizes a rapid scanning system which quickly enables detecting the location of white blood cells and defining a field about the blood cell which is scanned for classification of the type of white cell located within the field. The masking and filtering process for detecting white cells avoids the necessity of examining other than white cells in time consuming detail.

13 Claims, 18 Drawing Figures

BASIC TIMING

FAST SCAN TIMING

MODE CONTROL

SLOW SCAN TIMING

PATTERN CAPTURE

WINDOW CONTROL

SLOW SCAN CONTROL

RECYCLE AND BLANKING CONTROL

SCANNING SYSTEM FOR LOCATION AND CLASSIFICATION OF PATTERNS

This invention relates generally to pattern recognition systems and more particularly to a scanning system for location and classification of patterns for use in an automatic blood cell classification.

One of the more important functions of a hospital laboratory is providing a differential white cell count of the blood of the patients in the hospital. Many diseases and abnormalities in a patient are uncovered by the differential white cell blood count in the blood. In order to make a differential white cell count in blood, a sample of whole blood is smeared and dried on a slide and a stain is used to enhance the contrast. In typical techniques, utilized today, a hundred or more of the white cells are observed, recognized and classified in order to accomplish a differential white cell count.

Typically, the whole blood smear is dyed with a Wright Stain which utilizes two dye components, eosin and methylene blue. Due to the spectral absorbence of these dyes in the whole blood smear, the red blood cells appear reddish in the whole blood smear and the white blood cells appear bluish, with the exception of the eosinophil and neutrophil which appear to have a reddish cytoplasm but still retains a blue nucleus.

The disadvantages of prior automated differential white cell counters is that they have been too costly but, more importantly, much too slow. These problems have been caused by the fact that in biological and natural systems such as in the blood system the shapes of elements in the system are not normally disposed in the same direction with respect to other shapes in the system. Thus in a whole blood smear, the white blood cells are not each disposed in the same alignment with respect to one another. Processing times are therefore quite lengthy in view of the fact that conventional masking systems are not appropriate with patterns which vary considerably within a class and which also have no fixed disposition with respect to a defined border.

A pattern recognition system which has particular application in biological and natural or other systems is shown in co-pending U.S. Application Ser. No. 376,246 filed July 3, 1973 which is a continuation of U.S. Application Ser. No. 117,996, now abandoned. The system which is disclosed therein enables the classification of different patterns in accordance with the shape of the pattern. The system is unaffected by the disposition of the object in a two dimensional plane. The system can therefore distinguish between various white cells in a blood smear in order to make a differential white cell count in blood. The system disclosed in the aforesaid patent application morphologically distinguishes the various ones of the white blood cells.

Another considerable problem in making an automatic differential white cell counter is to automatically find the white cells within the whole blood smear. This problem has two aspects to it. the first is how to efficiently scan the blood smear without missing the white cells. The second aspect is avoiding unnecessary time examining the patterns in a whole blood smear other than the white cells. In addition to the white cells there are, of course, other classes of patterns which are disposed in a whole blood smear. That is, in addition to the white blood cells there are red cells and platelets. There is also the possibility of foreign matter being disposed on the slide.

It is therefore an object of the invention to overcome the problems set forth above.

Another object of the invention is to provide a scanning system for the location and classification of patterns which facilitates locating and classifying white blood cells in a whole blood smear.

Another object of the invention is to provide a new and improved scanning system which uses a faster search speed for covering areas in locating a pattern to be examined and utilizes a rescan for examining in greater detail patterns detected.

Still another object of the invention is to provide a new and improved pattern recognition system for use in a white blood cell differential counter which facilitates the location of white blood cells by filtering out information pertaining to red cells and platelets.

Yet another object of the invention is to provide a new and improved pattern recognition system with a scanninng system which substantially lowers the amount of time required to provide a white blood cell differential count.

These and other objects of the invention are achieved by providing a pattern recognition system for blood cell classification which includes means for scanning fields in a whole blood smear. The system also includes means responsive to the scanning means for generating signals corresponding to the colors of the field at the position scanned. The means responsive includes filtering means for dividing the signals corresponding to the color into a plurality of the spectral bands.

Color processing means are provided which are responsive to the signals for reducing information in the signals relating to red cells and providing a signal representative of the darkness of the area scanned to quantizing means responsive to the processing means for generating a quantized signal. The quantizing means has a threshold level which is normally exceeded only by the nucleus of a white cell or a platelet. Detection means are provided which are responsive to the quantized signal. Detection means includes a mask which will normally be enabled by the nucleus of all the white cells but which will not be enabled by a platelet or foreign material in the blood smear.

The means for scanning the field traverses the field in a first direction in a fast scan and in a second direction in a slow scan. The scanning means traverses the second direction at a first speed until the detection means detects a white blood cell. Control means are responsive to the detection signal for backing up the scanning means in the second direction and causing the scanning means to traverse the pattern at a second speed slower than the first speed. At the slower speed, the white cell is examined in greater detail by the pattern recognition system for classification of the type of white cell that has been examined.

Other objects and many of the attendant advantages of this inventionn will be readily appreciated as the same becomes better understood by reference to the following detailed description when considered in connection with the accompanying drawings wherein.

Referring now in greater detail to the various figures of the drawings wherein like reference numerals refer to like parts, the pattern recognition system embodying the invention is shown generally in FIG. 1.

Figure 1:
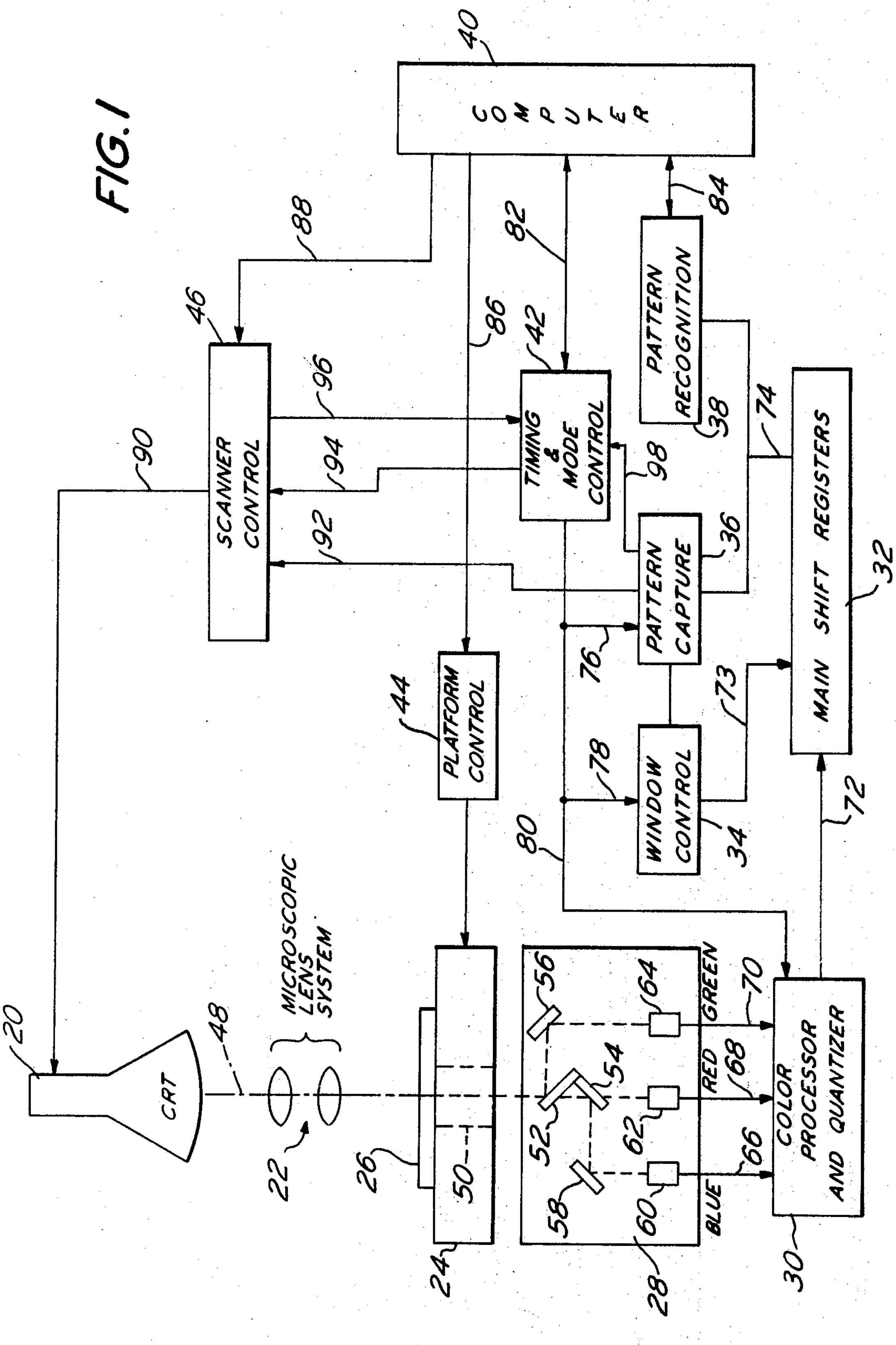
FIG. 1 is a schematic block diagram of a pattern recognition system embodying the invention.

The pattern recognition system in FIG. 1 is adapted to provide a differential white cell count from a whole blood smear. The system includes a flying spot scanner optical system which includes a cathode ray tube 20, microscopic lens system 22 a platform 24 for supporting a glass slide 26 having a whole blood smear thereon, a light component separator 28, a color processor and quantizer 30, a main shift register 32, a window control 34, a pattern capture 36, pattern recognition circuitry 38, a computer 40, timing and mode control 42, platform control 44 and scanner control 46. The cathode ray tube (CRT) 20 and the microscopic lens system 22 are preferably mounted within a housing which is light sealed so that a beam of light 48 can be directed through the microscopic lens system for focusing on slide 26. Similarly the platform 24 and the light component separator 28 are also encased in a housing to prevent light, other than the beam of light 48, from entering the light component separator 28. The platform 24 includes an opening 50 through which the beam 48 is directed to the light component separator.

The beam of light 48 is produced by the cathode ray tube 20 which provides the beam in approximately a 3 inch × 3 inch scan raster on the face of the cathode ray tube which is directed and focused by the microscopic lens system down to a field of the size approximately 300 microns × 300 microns. Thus a scan raster of light is directed at the slide 26 to traverse approximately a 300 × 300 micron field in the blood smear. The light passing through the slide 26 is directed to the light component separator 28 which filters the incoming beam and provides light through three spectral channels. The red, green and blue channels are chosen in accordance with the spectral absorbence of the component dyes in the Wright Stain. The light component separator 28 and the color processor and quantizer are the subjects of co-pending U.S. Application Ser. No. 298,062 filed October 16, 1973 by Miller, Levine and Partin for Color Separation For Discrimination in Pattern Recognition Systems. The disclosure in this application is incorporated by reference herein.

The light component separator includes a pair of dichroic mirrors 52 and 54, a pair of mirrors 56 and 58 and three photomultipliers 60, 62 and 64. The light beam 48 which passes through the blood smear on glass slide 26 enters the light component separator 28 and the green component of light beam 48 is reflected at a right angle by mirror 52 to mirror 56 which, in turn, reflects the entire green component of the light beam to photomultiplier 64. The component of the light remaining after the green portion of light beam 48 is reflected out of the beam by dichroic mirror 52, is passed through dichroic mirror 52 to dichroic mirror 54. Dichroic mirror 54 also extends at a 45° angle with respect to beam 48 as does dichroic mirror 52. The blue component of light beam 136 is reflected at a right angle from beam 48 to mirror 58 which reflects the blue component of the beam to a photomultiplier 60. The remaining component of the light beam 48 is then passed through dicroic mirror 54 to photomultiplier 62. The photomultipliers 60, 62 and 64 convert the three light components into electrical signals which are generated on line 66, 68 and 70 which are connected to the color processor and quantizer 30. The color processor and quantizer 30 preprocesses the signals on lines 66, 68 and 70 and quantizes the signals for providing the signals in binary form to the main shift register 32.

Window control unit 34 provides shift pulses on line 72 to the main shift register 32. The data received from the color processor and quantizer 30 is determined by window control 34 which is connected to the main shift register via line 73. The pattern capture unit 36 and the pattern recognition are connected to the output of the main shaft register via lines 74. The timing and mode control 42 are connected via lines 76, 78 and 80 to the pattern capture unit, the window control unit and the color processor and quantizer 30, respectively. The mode control basically alternates the system between two modes of operation. The first mode is the search mode in which the scanner quickly traverses a field in the blood smear for determining where white cells are located. The second mode of operation is the rescan or classification mode wherein an area in which a white blood cell has been found is reexamined more closely so that the type of white blood cell that is being examined can be determined. The timing and mode control is also connected via lines 82 to the computer 40. Computer 40 is connected via lines 84 to the pattern recognition unit to the platform 44 via lines 86 and to the scanner control 46 via lines 88.

The scanner control 46 is connected via lines 90 to the CRT and is also connected to the output line 92 of the pattern capture unit 36. The platform control 44 is mechanically connected to the platform 24 and moves the platform 24 after a 300 micron × 300 micron field has been completely examined for white cells.

The platform control includes a stepping motor for moving the platform 24 in a predetermined pattern to assure that a separate and distinct field is viewed in each of the succeeding scans of the slide 26. The recycling of the beam 48 is controlled by the scanner control 46 which is connected to the timing and mode control 42 via lines 94 and 96. The mode control portion of the timing and mode control unit 42 causes the scanner control to operate the CRT in accordance with the mode that the system is in.

Figure 2:
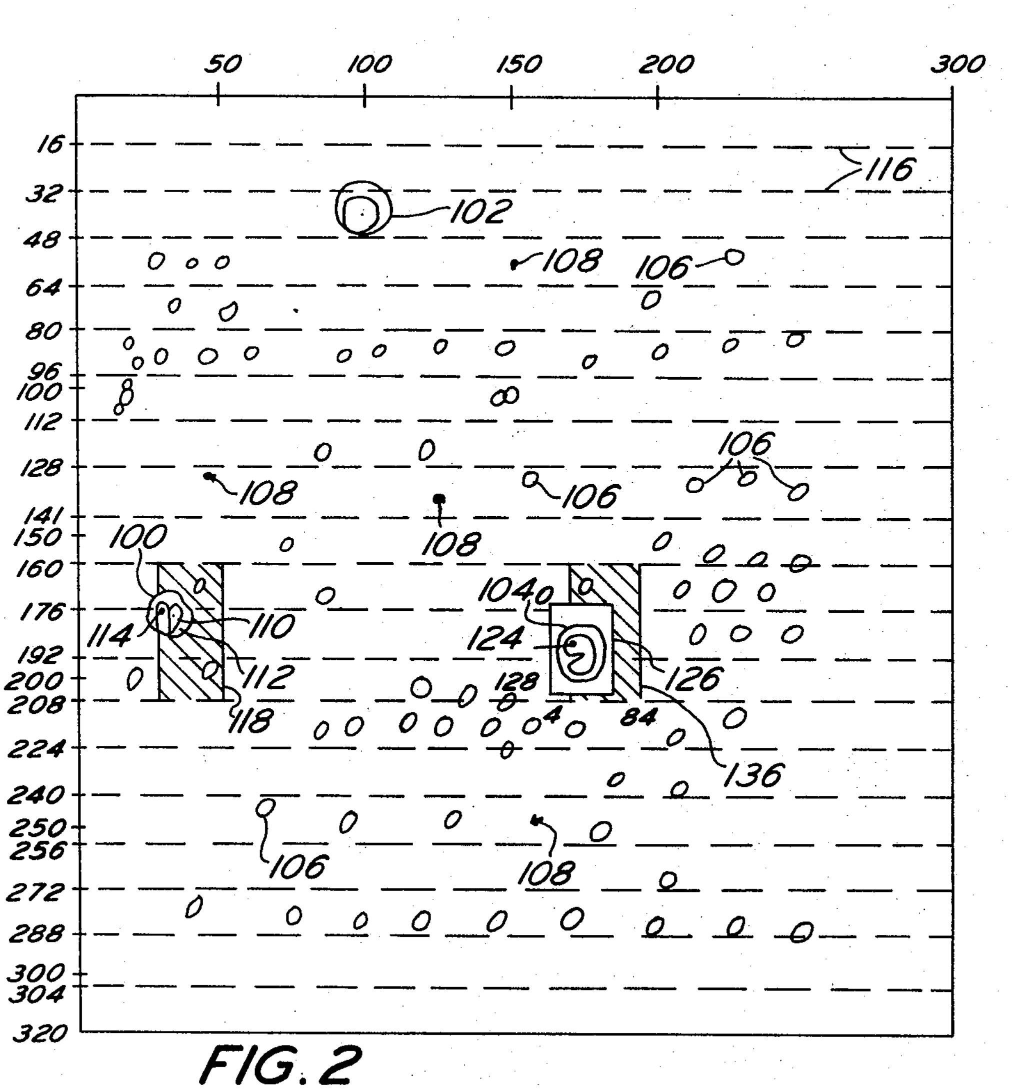
FIG. 2 is an enlarged top plan view of a rectangular portion of a field in a whole blood smear.

A 300 × 320 micron field of a whole blood smear is diagrammatically shown in FIG. 2. There are various classes of patterns within a blood smear. A first class of patterns in the blood smear are the white blood cells which include cells 100, 102 and 104. Cell 100 is an eosinophil white cell. Cell 102 is a lymphocyte white cell and Cell 104 is a banded neutrophil white cell. A second class of patterns found throughout the blood smear around and adjacent the white cells are the red cells 106. In addition, there is a third class of patterns which are comprised of platelets 108 which are also scattered throughout the blood smear.

Among other things, the red cells can be differentiated from the white cells by the fact that not only are the red cells smaller, but the red cells are also different in color from the white cells. That is, the red cells appear red whereas the white cells, as a result of the absorption of the component dye in the Wright Stain appear bluish or a deep purple. The platelets 78 are also a deep purple or blue in color but are much smaller than the white blood cells.

During the search mode of the pattern recognition system shown in FIG. 1 the beam 48 starts in the field shown in FIG. 2 at the upper lefthand corner, proceeds to the bottom of the field and is then moved one micron to the right and starts at the top of the field one micron space from the leftmost edge of the field. Thus, the fast scan direction of the beam in FIG. 2 is from top to bottom and the slow scan direction is from left to right. As will hereinafter be seen, the beam actually traverses approximately 300 microns in the fast scan direction.

In the search mode, the beam progresses from left to right in the slow scan direction at a rate of one micron per fast scan sweep. Accordingly, the first white cell which would be reached by the scanner would be white cell 100. The white cell 100 includes a nucleus 110. The nucleus is surrounded by a cytoplasm 112. It should be noted that there is a dark point 114 in the nucleus 110 of the white cell 100 which indicates the point at which a pattern mask in the pattern capture 36 is enabled because a nucleus of a white cell has been scanned by the scanner. The pattern mask is diagrammatically shown in FIG. 3. The pattern mask in FIG. 3 actually represents an AND gate which is connected to the output line of the main shift register stages which correspond to the point in the field shown at 114 in FIG. 2. When this mask is enabled, the pattern capture 36 enables the timing and mode control, via line 98, to cause a rescan of the area including the white cell 114. The timing and mode control provides a signal to the scanner control which causes the slow scan control signal to move the beam back to a point approximately 7 microns from the leading edge of the point at which the detection or the capture of the white cell was made. The fast scan sweep continues to extend from the top of the field to the bottom of the field and the scanner progresses 20 microns from the initial edge at the rate of a quarter micron per fast scan line or at a speed of one-fourth the slow scan speed in the search mode. It should be noted that superimposed over the field in FIG. 2 is a plurality of discontinuous lines 116 which extend from left to right and which divide the field into 20 areas from top to bottom. That is, the fast scan direction is broken up into 20 distinct areas. After the beam has progressed 20 microns in the rescan, the pattern recognition circuitry 38 has completed classification of the white cell which has been scanned and provides the signal to computer 40. The computer 40 then provides a completion of recognition signal on line 82 to the timing and mode control 42 which initiatees the scanner initiates 46 to cause the scanner to start another search mode beginning at the point 114 at which a white cell was detected. Thus, a fast scan line starting at the top of the field in FIG. 2 starts at the slow scan position in which point 114 is detected.

To prevent capturing of the cell 100 again, the pattern capture circuitry 36 inhibits the pattern mask from detecting a white cell in the area in which the white cell 100 was captured. Thus, since the white cell 100 was captured with the capture point being in the area between 176 and 192 microns in the fast scan direction the pattern mask is inhibited for 24 microns of movement in the slow scan direction from detecting any white cell in the area between 176 and 192 microns in the fast scan direction. In addition, the pattern mask is also inhibited in the adjacent areas on each side of the area in which the pattern was detected so that between the points 160 and 208 microns in the fast scan direction the pattern mask is inhibited. This is shown by the shaded rectangle 118 which encompasses the white cell 100.

Thus, if a white cell were disposed directly adjacent to cell 100 with its nucleus within the shaded rectangle 118 then the cell would not be counted during the cell classification.

Figure 3:
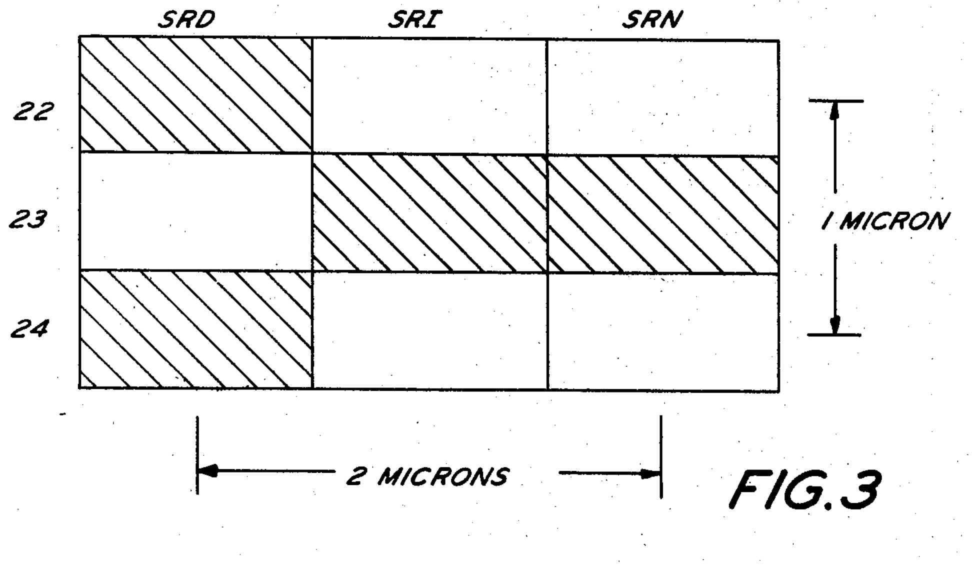
FIG. 3 is a diagramatic representation of a pattern mask which is utilized in detecting the presence of a white blood cell in a whole blood smear.

As the search scan proceeds, the next cell in FIG. 2 that would be detected would be the lymphocyte white cell 102. After the lymphocyte white cell is classified and the search scan proceeds, the next cell that would be detected by the pattern mask in the capture circuitry 36 is white cell 104. White cell 104 includes a cytoplasm 120 and a nucleus 122. As the quantized data from the color processor and quantizer 30 which is the binary representation of the signals from the photomultiplier tubes is shifted in said register past the pattern capture 36, the pattern shown in FIG. 3 is superimposed over the binary quantization in the main shaft register. The pattern shown in FIG. 3 is being superimposed over the top lefthand corner of the nucleus 122 of the white cell 104 which is the first portion of the nucleus which passes underneath the capture pattern. As seen in FIG. 3, the mask or capture pattern is two microns by one micron wide. It is also in a generally Y shape. This pattern is large enough and of a specific shape which avoids the capture mask from being enabled by platelets, but which fits into the nucleus of substantially all well formed white cells and thus enables capture of white cells while excluding platelets.

The color processor and quantizer provide signals on lines 72 to the main shift registers which effectively filters out all red cell information provided on slide 26 and the quantizing level is set high enough so that the cytoplasm information is also rejected so that only the nucleus of the white cell is examined by the pattern capture mask.

The numerals 22, 23 and 24 on the left side of FIG. 3 indicate the bit positions respectively of the shift register aperture which is examined as the binary quantization is shifted through the main shift registers 32. The legends, SRD, SRI and SRN indicate the specific shift registers of the aperture in which the capture gate is connected.

Referring back to FIG. 4, the pattern 124 is superimposed over the nucleus 122 to indicate the point at which capture is made of the white cell 104. Surrounding the white cell 104 is a border line 126 which diagrammatically represents the frame or window of the field in FIG. 2 which is examined during the rescan or classification mode. That is, when the mask in the pattern capture 36 senses the nucleus 122 of white cell 104 a signal is applied via line 92 the the scanner control 46 which causes the beam to move backward in the slow scan direction so that it moves to a point seven microns to the left of point 124 at which capture was made in the nucleus 122 of cell 104. The seven microns backup corresponds to the leftmost border of rectangle 126 which encircles the white cell 104. In addition, the point of caputre 124 is placed approximately half way between the upper and lowermost edges of the rectangle 126 which represents the point in the fast scan between which the data fed to the main shift register is accepted for classification by the pattern recognition circuitry 38.

Figure 5:
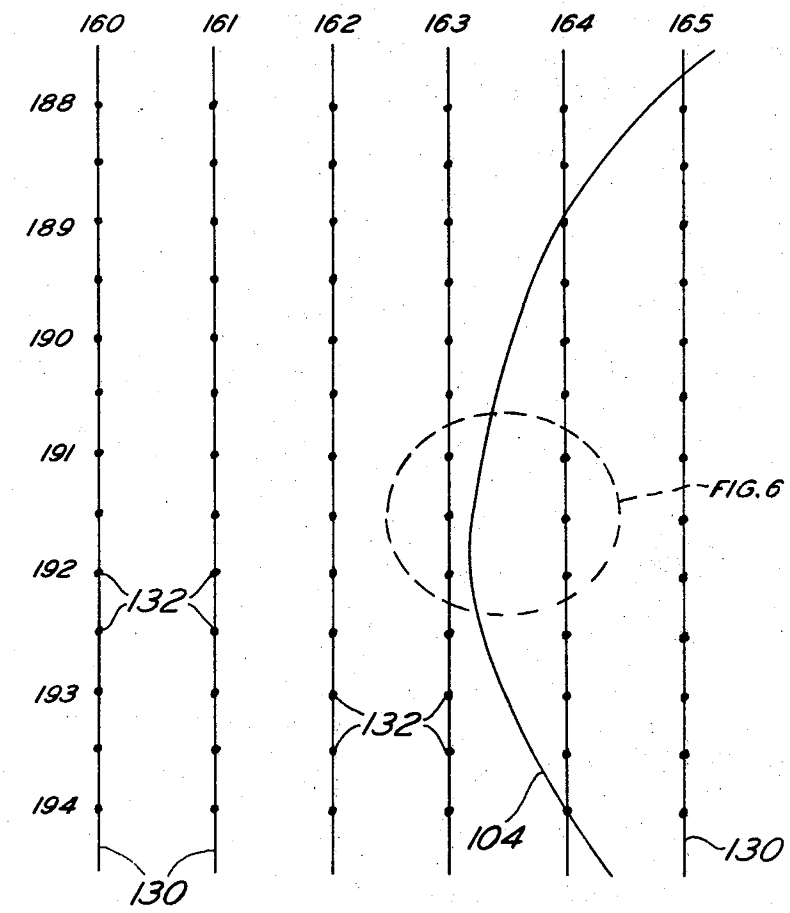
FIG. 5 is an enlarged top plan view of a small area of the whole blood smear shown in FIG. 2 with the path traversed by the scanning beam superimposed thereover.

This will be explained in greater detail with respect to the window control. For the purposes of illustration, however, FIG. 5 is a diagrammatic representation of the field adjacent to cell 104 between the areas 188 to 194 microns in the fast scan direction and 160 to 165 microns in the slow scan direction. It should be understood that the vertical lines 130 indicate the position over which the beam passes. The points 132 represent the sampling points along the fast scan lines. As can be seen in FIG. 5, the samples are taken one half micron apart in the fast scan direction. In the slow scan direction that is only one line per micron in the search scan mode. Thus, the scan raster moves 1 micron in the slow direction after each fast scan.

Figures 4, 6:
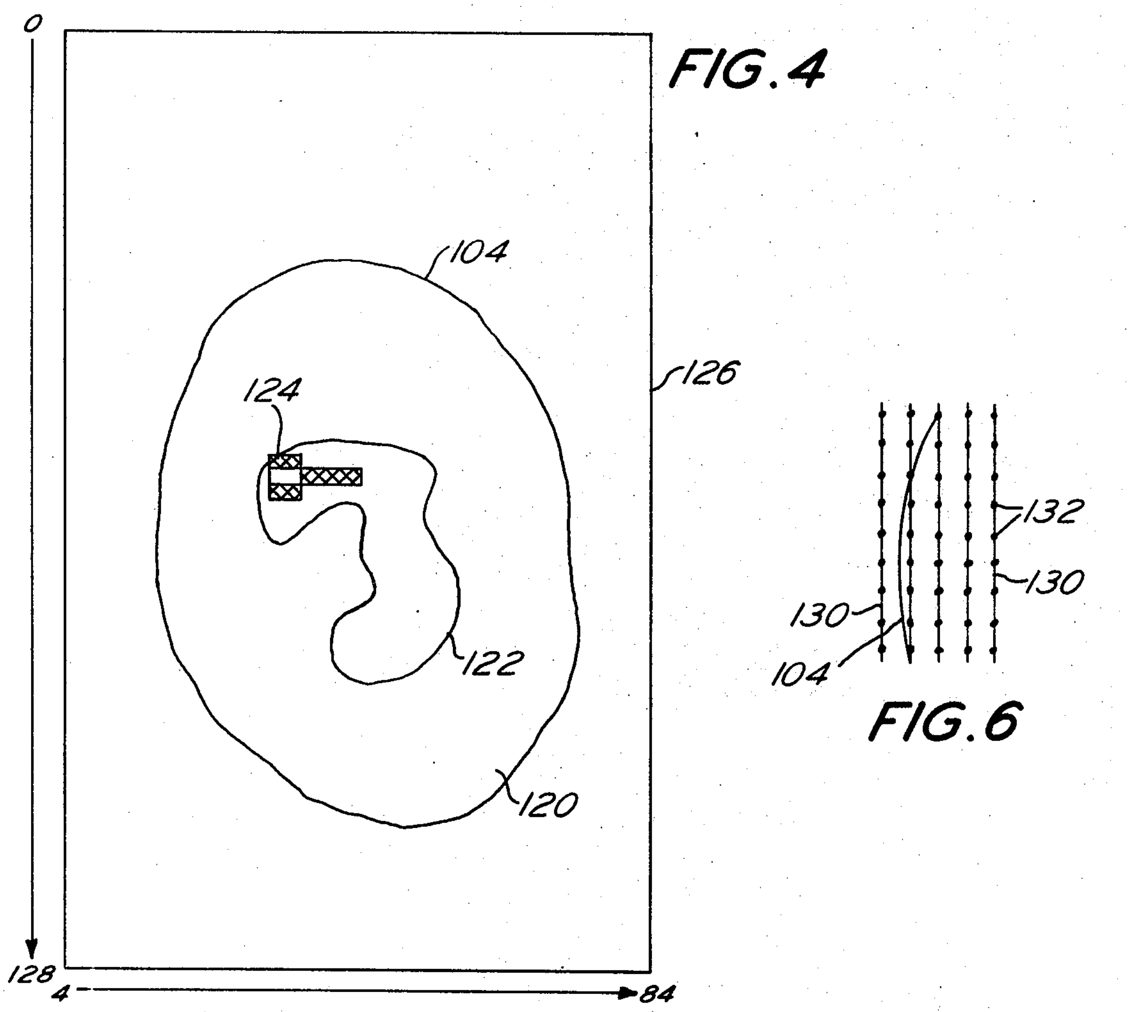
FIG. 4 is an enlarged top plan view of a portion of the field in FIG. 2 including a neutorphillic band white cell.
FIG. 6 is an enlarged top plan view of a portion of the field shown in FIG. 5 with the path traversed by the beam superimposed thereon.

FIG. 6 shows the portion of the field in FIG. 5 within the dotted lines labeled FIG. 6 and shows the field when the beam is in the rescan mode. Lines 130 are now a quarter of a micron apart in the slow scan direction and the samples 132 are taken one quarter micron apart in the fast scan direction.

Referring back to FIG. 4 the legend O to 128 from top to bottom on the lefthand side of said FIG. 4 indicates that the rectangle 126 represents 128 samples which are taken of the field within the window in the fast scan direction during the rescan mode. On the bottom line the arrow between 4 and 84 indicates that 80 samples are taken in the slow scan direction. The counts 4 to 84 represent the counts in a rescan counter which keeps track of the number of fast scan lines which are utilized in the slow scan direction during a rescan of a pattern.

A shaded rectangle 136 is provided about the cell 104 in FIG. 2 which is analogous to the shaded rectangle 118 provided around cell 100. This indicates that during the next search scan a white cell cannot be detected within the three areas from 160 to 280 microns in the fast scan direction over the next 24 microns traversed in the slow scan direction since there are only three cells shown in the field in FIG. 2, the beam would progress to the end of the field at the right side of FIG. 2 and then be recycled. During the recycle the computer provides on line 86 to the platform control a signal causing the platform control to move the platform to the next position so that the next field can be scanned in the blood smear on slide 26.

In summary, the system of FIG. 1 operates as follows. The scanner control 46 causes the beam 48 in the cathode ray tube 29 to be focused on the blood smear on slide 26 to move approximately 300 microns in a fast scan direction taking samples at one half micron intervals. The beam is moved 1 micron in the slow scan direction for each fast scan line until the mask in the pattern capture 36 is enabled. The pattern capture 36 provides a signal to the timing and mode control 42 which changes the mode to a rescan and also provides a signal to the window control based on the point at which the capture mask was enabled. The timing and mode control 42 causes the scanner control to move the beam backwards approximately 7 microns to the left of the point at which capture was made.

The fast scan is then sampled at a one quarter micron interval in a portion determined by the point at which capture was made. Thus, as seen in FIG. 4, the top of the rectangular frame 126 starts approximately 60 samples above the point at which capture of the pattern was made. The window control causes the 128 sampled bits from each fast scan line to be entered into the main shift register 32 during the 80 fast scan lines 4 through 84 of the rescan mode. When pattern recognition has been made by pattern recognition circuitry 38, signals are provided to the computer with the information gathered by the recognition system circuitry 38 and the computer provides a recognition signal on line 88 to the scanner control 46 which causes the search mode to be reinstituted thereby causing a fast scan to start at the line in the slow scan direction at which the point of capture was made.

The pattern capture circuitry 36 includes inhibiting means which then prevent recapturing of the white cell within the three discrete areas of the fast scan direction in which the white cell was captured during the next 24 fast scan lines of the search mode.

Figure 7:
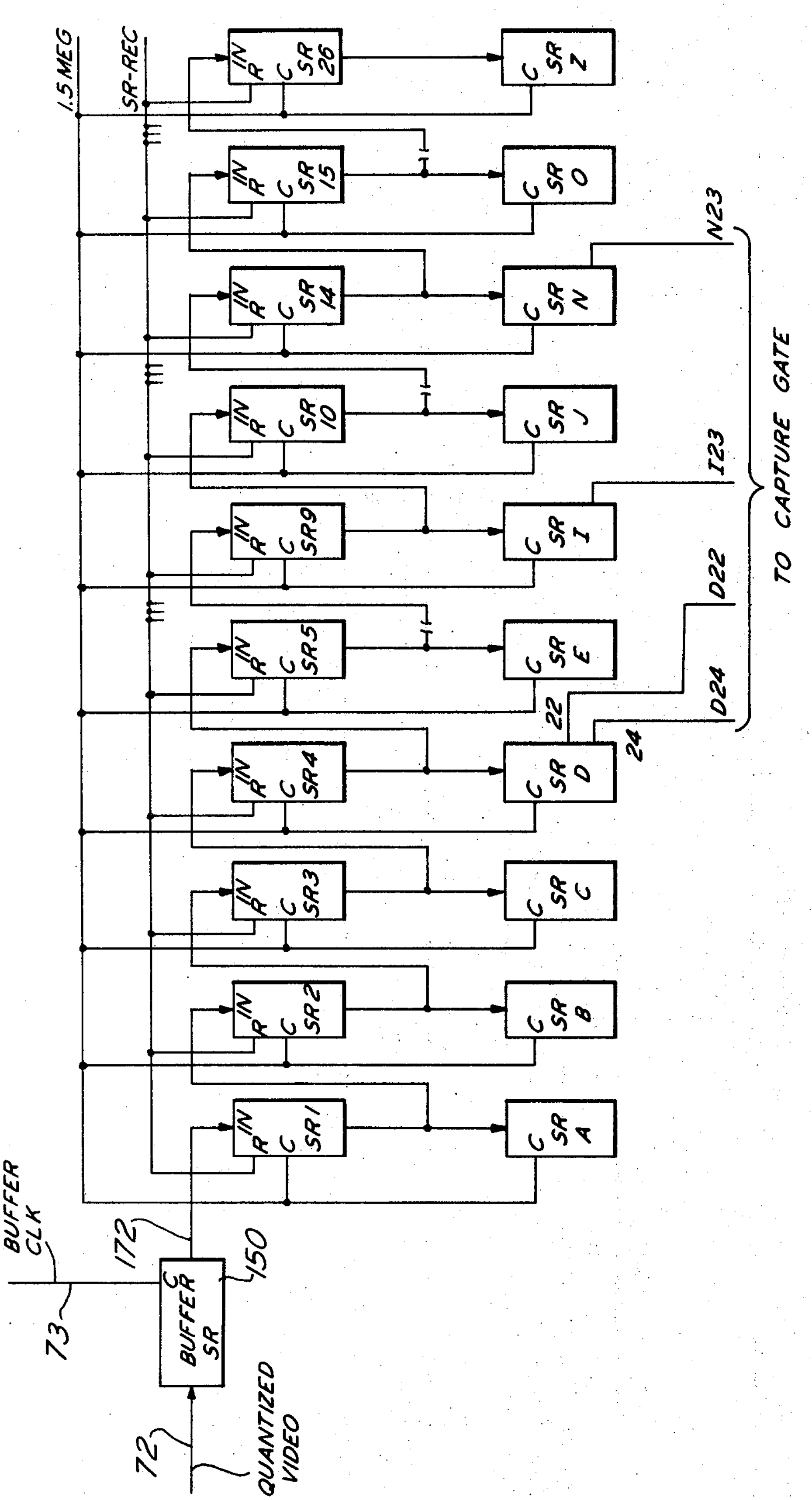
FIG. 7 is a schematic block diagram of a portion of the main shift register.

A preferred pattern recognition system for use in classification of the white cells is shown in the aforementioned Application Ser. No. 376,246. The main shift registers 32 are shown in FIG. 7. The main shift registers include a buffer shift register 150, 26 shift registers SR1 through SR26, and 26 shift registers SRA through SRZ. Shift registers SR1 through SR26 all include the circuitry shown in FIG. 8.

Figure 8:
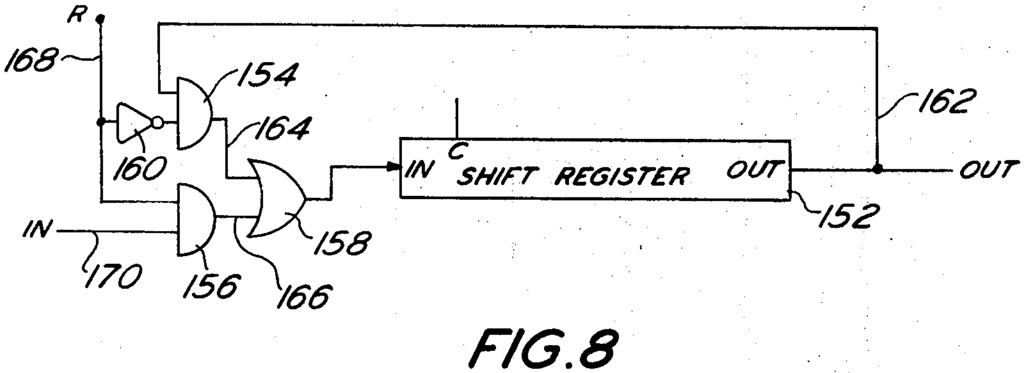
FIG. 8 is a schematic block diagram of a shift register circuit utilized in the main shift register.

As seen in FIG. 8 the shift registers SR1 through SR26 each include a 128 bit shift register 152 and control gating which comprises a pair of AND gates 154 and 156, an OR gate 158 and an inverter 160. Shift register 152 has an output line which is connected via line 162 to a first input of AND gate 154. In addition, the shift 152 also has an input line which is connected to the output of OR gate 158. One input of OR gate 158 is connected to the output of gate 154 via line 164 and the other input line 166 of OR gate 158 is connected to the output of AND gate 156. Line 168 which is the R input line of the circuit is connected to one input of AND gate 156 and the second input of AND gate 154 via the inverter 160. Line 170 is the IN line of the circuit and is connected to the second input of AND gate 156.

When the input signal to line 168, the R input line of the circuit, is low, the information in the 128 bit shift register 152 recirculates via line 162 through AND gate 154 and OR gate 158 to the input line of the shift register 152. When the signal on line 168 is high, the AND gate 154 is disabled. However, AND gate 156 becomes enabled to pass signals on line 170 to the input of the shift register 152.

The C input line of the shift register 152 receives clock pulses and shifts the data from the input line to the output line one bit at a time for each pulse received on the clock input line.

Referring back to FIG. 7, it can be seen that 26 of the shift register circuits shown in FIG. 8 are utilized in the main shift register. For purposes of clarity the stages SR6 to SR8, SR11 to SR13 and SR16 through SR25 have not been shown in FIG. 7. The input to the buffer shift register 150 is line 72 from the color processor and quantizer and provides quantized video signals to the buffer shift register 150. The buffer shift register 150 receives shift pulses from the BUFFER-CLK line 73 which shifts data into the buffer shift register and effectively samples the quantized pattern at the rate of the shift pulses provided on line 73. The buffer shift register 150 is connected at its output line to the input of shift register SR1. The output line of shift register SR1 is connected via line 174 to the input of shift register SR2 and also via line 176 to the input of the 24 bit shift register SRA. Similarly, the output lines of shift registers SR2 through SR26 are each connected to the input of shift registers SRB to SRZ, respectively.

The output lines of shift registers SR2 through SR25 are connected to the input lines of shift registers SR3 to SR26, respectively. As can be seen, the clock input of each of registers SR1 through SR26 and SRA through SRZ are connected to the 1.5 MEG line which receives shift pulses at a 1.5 megacycle rate. The R input to each of the shift registers SR1 through SR26 are connected to the SR-REC line. The signal on the SR-REC line controls whether the shift registers SR1 through SR26 recirculate and therefore reject data from the buffer shift register or receive data from the buffer shift register. When the SR-REC line is high the information is accepted from the buffer shift register 150.

The buffer shift register 150 is also a 128 bit shift register. When the system is in a search mode, the SR-REC line is high all the time and the clock pulses on line 73 to the buffer shift register are constantly at a 1.5 megacycle rate. Thus, during the search scan all of the binary quantized video that is received by the buffer shift register 150 is passed into the shift registers SR1 through SR26 which is serially fed from the beginning of shift register SR1 to the end of shift register SR26. The shift registers SRA through SRZ represent an aperture in which data in the shift register comprised of shift registers SR1 through SR26 can be sampled. That is, the shift registers SR1 through SR26 are preferably MOS shift registers which have taps only at the input and output thereof. The shift registers SRA through SRZ are 24 bit shift registers, but each of the 24 bits of the shift register can be sampled. Thus, for pattern classification, as well as pattern capture, even though the information comes in at one end of the shift registers and goes out the other end without being recirculated, nonetheless, all of the data that is fed through shift registers SR1 through SR26 ultimately passes through shift registers SRA to SRZ and can therefore be used for examining the entire pattern that goes therethrough.

It should be noted that the shift registers SRD, SRI and SRN each have output lines. The output lines for shift registers SRD which are labelled, respectively, D22 and D24 represent output bits 22 and 24 of shift register D. The output line I23 connected to shift register SRI represents the output of bit 23 of shift register SRI. Similarly, output line N23 of shift register SRN represents the output of bit 23 of shift register SRN. Lines D22, D24, I23 and N23 are connected to the capture gate of the pattern capture circuitry 36.

Referring to FIG. 3, it can therefore be seen that the pattern mask represents the output of bits 22 and 24 of shift register SRD, bit 23 of shift register SRI and bit 23 of shift register SRN which must each be in the one state in order to capture a white cell. It should be noted that the lines for the capture mask are tapped off of shift registers SRD, SRI and SRN which are respectively connected to shift registers SR4, SR9 and SR14 which are five shift registers apart. This is because each fast scan line represents 640 1.5 megacycle pulses. Accordingly, it requires five 128 bit shift registers to store an entire line of samples in a fast scan direction.

During the rescan mode, the SR-REC line receives a low signal for all but 128 counts of the fast scan counter which controls the fast scan lines. The buffer shift register receives shift pulses from line 73 at a 1.5 megacycle rate during the time that the count in the fast scan counter goes from 640 to 767, but line 73 receives pulses at a 3.0 megacycle rate during the time that the window is open to pass data from the quantized video to the buffer shift register representative of the information in the area including the white cell which has been captured. After the 128 bits of each fast scan line from the window area have been placed in the buffer shift register 150 the signal on line SR-REC goes high and the 1.5 megacycle clock pulses start in the buffer shift register 150 to cause a readout of the information into the shift register SRI. During the next fast scan line the data in shift register 150 is fed to SR1 and the data in SR1 is fed to SR2 and so on. In this way, only the information within the window 126 is fed into the shift registers SR1 through SR26. As the information is passed into the shift registers SR1 through SR26 during the classification scan, the information is passed off to shift registers SRA to SRZ and examined by the pattern recognition circuitry 38 which gives the information to the computer 40 for processing and as soon as a recognition of a white cell is completed, the computer provides a recognition signal which enables the scanner control to return to the search mode of operation.

Figure 9:
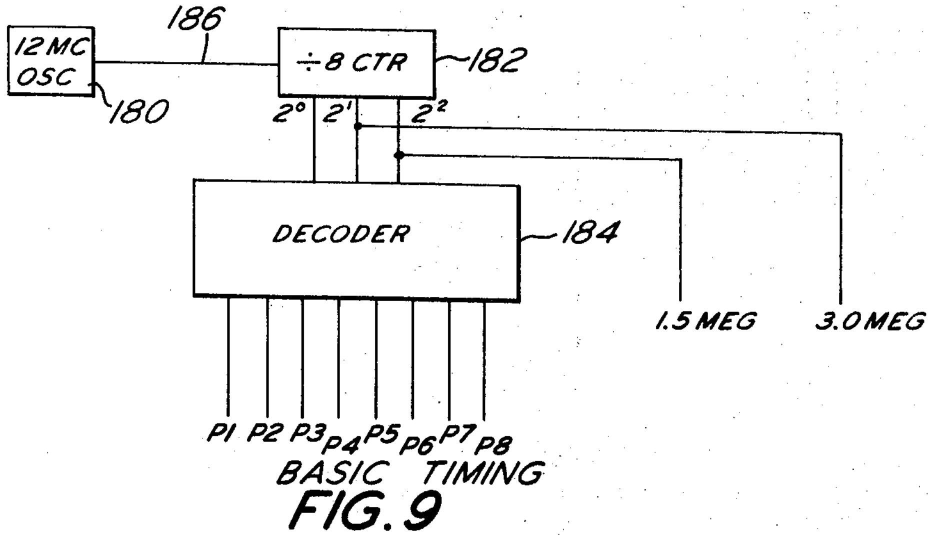
FIG. 9 is a schematic block diagram of the basic timing used throughout the system.

The basic timing for the timing control and the remainder of the circuitry is shown in FIG. 9. The basic timing circuitry includes a 12 megacycle oscillator 180, a divide by eight counter 182 and a decoder 184. The output of the 12 megacycle oscillator is connected via line 186 to divide by eight counter 182. The divide by eight counter 182 is a three stage binary counter having output lines which are labelled, respectively, $2^0$, $2^1$ and $2^2$. These output lines are connected to the decoder 184 which decodes the binary input on the lines from the divide by eight counter and provides signals on eight lines which are respectively labelled P1 through P8. The $2^1$ output line provides the clock pulses at a 3.0 megacycle rate on the 3.0 MEG line and the $2^2$ output line provides clock pulses at the rate of 1.5 megacycles which is provided on line 1.5 MEG. The lines P1 through P8 are each pulsed once for each 1.5 megacycle pulse. Thus the decoder 184 breaks each 1.5 megacycle count into eight phases. The P1 through P8 signals are each of very short duration and are generated by the binary counts of 000 through 111 (0 through 7), respectively.

Figure 10:
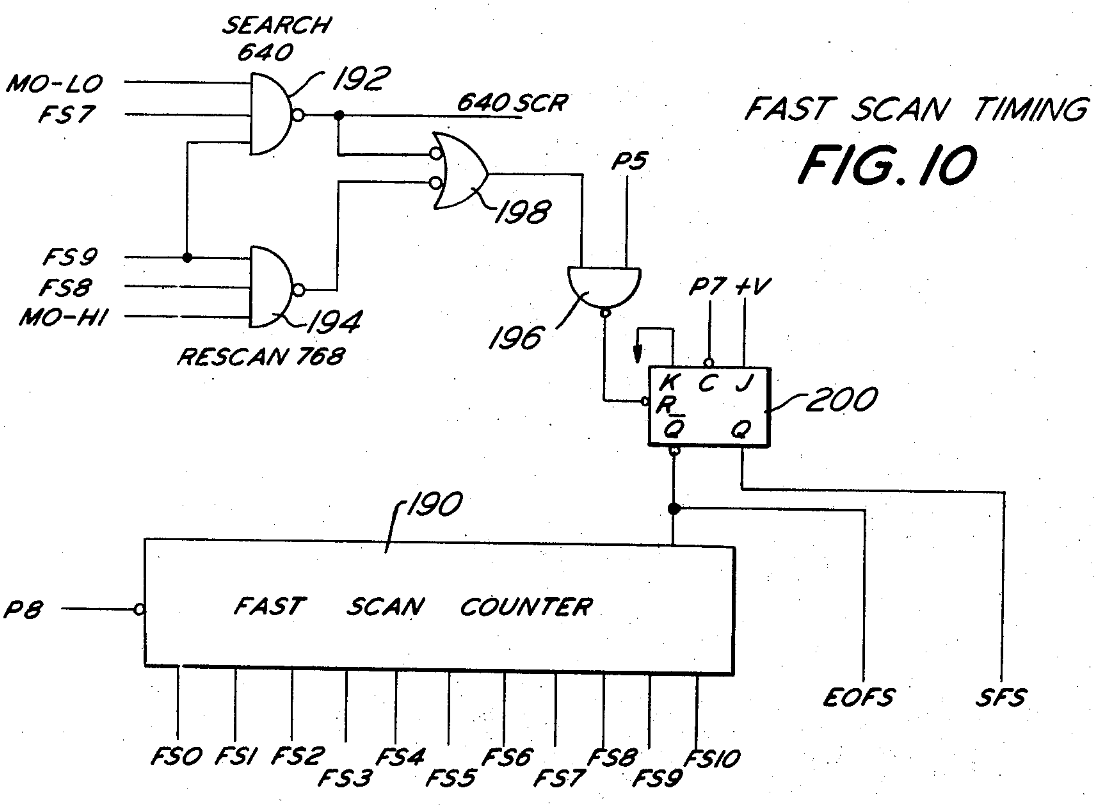
FIG. 10 is a schematic block diagram of the fast scan timing.

The fast scan timing is shown in FIG. 10. The fast scan timing circuitry includes the fast scan counter 190 and the control circuitry for recirculating the fast scan counter including AND gates 192, 194 and 196, OR Gate 198 and flip flop 200. With respect to the logic circuitry shown throughout the drawings, it should be noted that the half circles represent AND Gates and the crescent shaped gates represent OR Gates. Where circles are used at the inputs of the AND Gates or OR Gates it means that the ground signal is required to enable the gate. Where circles are used on the output lines of the gates, it means that when the gate is enabled, the output is ground. Similarly, where a circle is used as an input to a module such as a counter module it means that the module is clocked on the negative going pulse. With respect to the flip flops, conventional JK flip flops are used throughout for the flip flops.

The fast scan counter 190 is a conventional binary counter. The fast scan counter is stepped at a 1.5 megacycle rate by the signal at its clock input which is connected to output line P8 of the decoder. Thus the P8 signals step the fast scan counter at a 1.5 megacycle rate. The fast scan counter includes eleven output lines which are labelled FS0 through FS10, respectively. The output lines are connected to each of the first eleven stages of the fast scan counter and correspond to the $2^0$ through $2^{10}$ output lines of the binary counter. Output line FS9 is connected to a first input of both AND Gates 192 and 194. Output line FS8 of fast scan counter 190 is connected to the input of AND Gate 194. The second input to AND Gate 192 is the output line FS7 of the fast scan counter. The third input to AND Gate 192 is the line MO-LO which is high during the search mode of operation. The third input to AND Gate 194 is the MO-HI line. The signal on the MO-Hi line is high during the rescan mode of the system. The output of AND Gate 192 is connected to a first input of OR Gate 198 and is also connected to the 640S line. The AND Gate 194 is connected to the second input of OR Gate 198. The output of OR Gate 198 is connected to a first input of the AND Gate 196 and the second input to gate 196 is connected to the P5 line. The output of AND gate 196 is connected to the reset line of flip flop 200. The K input of flip flop 200 is connected to ground and the J input of flip flop 200 is connected to +V. The clock input is connected to output line P7 of the timing decoder. The $\overline{Q}$ output line is connected to the reset of the fast scan counter 190 and also to an output line EOFS which indicates the end of the fast scan. The Q output line is connected to the SFS line.

In operation the fast scan counter is clocked by the phase 8 pulses P8 at a rate of 1.5 megacycles. When the fast scan counter is in a search mode the MO-LO signal is high thereby allowing gate 192 to be enabled when the count in the fast scan counter reaches 640. When AND gate 192 is enabled it causes the OR gate 198 to be enabled as the output of gate 192 is low and thereby allows the enabling of OR gate 198. When OR gate 198 is enabled the AND gate 196 is enabled by the first P5 pulse from the timing decoder. Thus gate 196 is enabled for a short spike causing a low signal on its output line which resets the flip flop 200 which remains reset until the P7 pulse goes low and thereby sets the flip flop as a result of the +V applied to the J input of flip flop 200. During the period that the flip flop 200 is reset it causes the $\overline{Q}$ output line to reset the fast scan counter after the fast scan counter reaches 640. During the rescan mode of operation the MO-HI signal is high thereby enabling gate 194 to be enabled when the fast scan counter reaches the count of 768. When AND gate 194 is enabled it causes the enabling of OR gate 198 which in turn causes AND gate 196 to be enabled on the next P5 high signal which thereby causes the resetting of flip flop 200 for a short period of time between the P5 and P7 pulse. As soon as P7 goes low the flip flop 200 is set again and the fast scan counter which was reset is again stepped during each P8 pulse.

It should therefore be noted that the fast scan counter, during the search mode, counts from zero to 640 and during the rescan mode from zero to 768.

Figure 11:
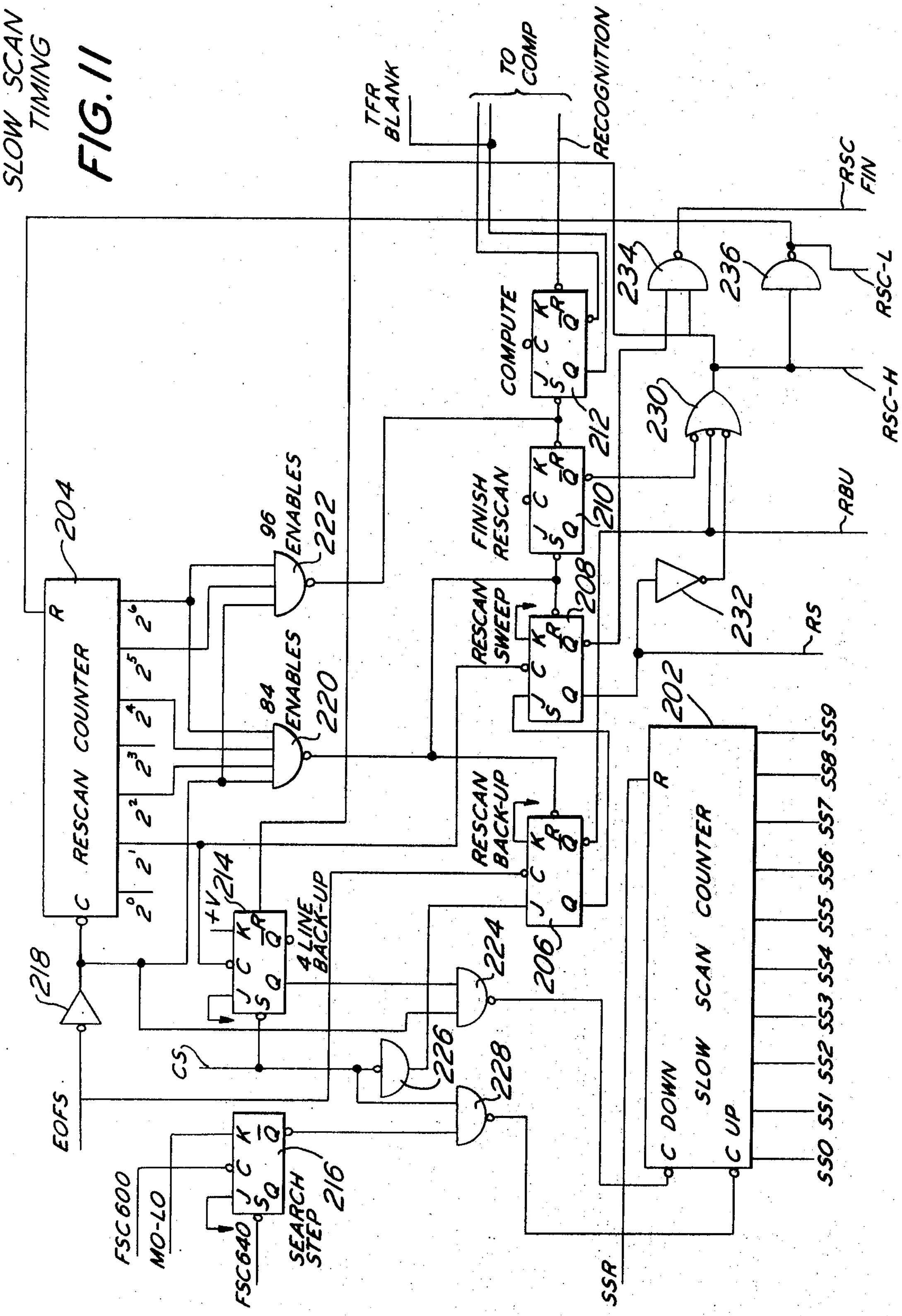
FIG. 11 is a schematic block diagram of the slow scan timing.

The slow scan timing circuitry is shown in FIG. 11. The slow scan timing includes slow scan counter 202, rescan counter 204, the rescan backup flip flop 206, a rescan sweep flip flop 208, a finish rescan flip flop 210, a compute flip flop 212, a four line backup flip flop 214 and the search step flip flop 216. The EOFS line from the fast scan timing is connected to the C input of the rescan counter 204 via an invertor 218. The rescan counter 204 is a binary counter having seven output lines which are labelled $2^0$ through $2^6$ and represent the output line of the respective stages of the binary counter. The output of invertor 218 is connected to a first input of each of the pair of AND gates 220 and 222. the remaining input lines of AND gate 220 are connected, respectively, to the output lines $2^2$, $2^4$ and $2^6$ of the rescan counter 204. The remaining inputs of AND gate 222 are connected to the output lines $2^5$ and $2^6$ of the rescan counter 204.

The rescan counter 204 keeps track of the number of fast scan lines that have been completed during a rescan mode. The output of invertor 218 is also connected to the first input of an AND gate 224. The second input line of the four line backup flip flop 214 is connected to input line CS. The CS line goes low when the capture mask in the pattern capture circuitry has detected a white cell. the CS line is also connected to an input of AND gate 228 and to an invertor 226, the output of which is connected to the J input of the rescan backup flip flop 206. The J input of flip flop 214 is connected to ground, the K input is connected to +V and the reset input is connected to the RSC-H line which is the output line of OR gate 230.

The input line connected to the K input of the search step flip flop 216 is the MO-LO line. The clock input of the flip flop 216 is the FSC 600 line which goes low when the count in the fast scan counter goes to 600. The J input of flip flop 216 is connected to ground and the set input is connected to the FSC 640 line which goes low when the count in the fast scan is 640. The MO-LO line to the K input of flip flop 216 inhibits the flip flop 216 from being reset then set at the end of each fast scan line during the rescan mode. The $\overline{Q}$ output line of flip flop 216 is connected to the second input of AND gate 228. The output of AND gate 228 is connected to the C up input of the slow scan counter 202. The output of AND gate 224 is connected to the C down input of slow scan counter 202. The reset input of slow scan counter 202 is connected to the slow scan reset line SSR. The slow scan counter 202 is a binary counter and has 10 output lines, each of which is connected to a different stage of the slow scan counter. The outputs lines which represent the outputs of the $2^0$ through $2^9$ stages are labelled respectively as SS0 through SS9.

The slow scan counter directly controls the location of the beam in the slow scan direction. The C input of the rescan backup flip flop 206 is connected to the EOFS line. The K input is connected to ground, the J input is connected to the output of invertor 226. The Q output line of rescan backup flip flop 206 is connected to the J input of rescan sweep flip flop 208, the $\overline{Q}$ output of flip flop 206 is connected to the input of OR gate 230 and to output line RBU. The rescan sweep flip flop 208 has its C input connected to the output of the $2^1$ stage of the rescan counter 204. The K input is connected to ground, the J input is connected to the Q output line of flip flop 206. The R input line of flip flop 208 is connected to the output of AND gate 220. The Q output line of flip flop 208 is connected via invertor 232 to the input of OR gate 230 and to the RS output line. The $\overline{Q}$ output line of flip flop 208 is connected to the input of AND gate 234.

The finish rescan flip flop 210 has its set input connected to the output of AND gate 220, its reset input connected to the output of AND gate 222 and its $\overline{Q}$ output connected to the input of OR gate 230. The output of OR gate 230 is connected to the input of AND gate 234 and to input line RSC-H as well as to the reset input of flip flop 214. The compute flip flop 212 has its set input line connected to the output of AND gate 222 and its reset input line connected to the recognition line which goes to the computer. The Q output line goes to the computer as well as to the output line TFR-BLANK. The $\overline{Q}$ output line of flip flip 212 goes to the computer. The output of OR gate 230 also is connected via output line RSC-H to an invertor 236. The output of inverter 236 goes to output line RSC-L as well as to the reset input of the rescan counter 204. The output of AND gate 234 is connected to the RSC-FIN line.

The operation of the slow scan timing is as follows:

During the search mode of operation, the MO-LO line is high thereby causing the search step flip flop 216 to be reset when FSC 600 goes low on the count of 600 in the fast scan counter. Flip flop 216 is set when the count of 640 is reached in the fast scan counter and thereby causes FSC 640 to go low at the set input. The $\overline{Q}$ output line of the flip flop 216 disables the AND gate 228 and thereby causes the slow scan counter to be stepped up one each time as fast scan line is completed. As soon as the capture mask in the pattern capture circuitry is enabled, the CS line goes low thereby causing the AND gate 228 to remain disabled during the period when the fast scan counter goes from 600 to 640 and thus not enabling the slow scan counter to count up. The CS signal also causes the four line backup flip flop to be set as soon as there has been a white cell capture which causes AND gate 224 to be enabled to pass pulses to the C down input of the slow scan counter at the end of the fast scan count which generates the EOFS signal pulses which is passed to the C down input of Counter 202 by gate 224. As soon as the CS signal went low, it also caused the rescan back up flip flop 206 to be primed for being set on the EOFS signal going low which causes the OR gate 230 to be enabled and thereby allows the reset signal to the rescan counter 204 to be released so that the rescan counter can count up during the rescan mode of operation. The four line backup flip flop 214 remains in the set position until the count in the rescan counter 204 changes from 3 to 4 thereby causing a negative going signal on the C input line which resets the flip flop 214 as a result of the K input being connected to +V.

Thus, four pulses are enabled to be passed by AND gate 224 to the slow scan counter. The lowering of the count by the number 4 in the slow scan counter effectively places the slow scan counter at the position where the start of the scanning of the captured pattern began. That is, because the main shift registers must receive three lines of data in order to recognize the capture pattern for a white cell and an additional scan line is completed, after the capture pulse is generated, the slow scan counter must be stepped down, 4 counts, in order to initiate a complete fast scan line when the search mode is restarted. With both gates 224 and 228 disabled when the count of 4 is reached in the rescan counter, the slow scan counter remains at the stepped down count for the remaining portion of the rescan mode of the pattern scanner.

When the rescan counter is stepped from a count of 3 to 4 the $2^1$ line goes low and causes the rescan sweep flip flop 208 to be reset as a result of the priming of the J input thereof by the high signal on the Q output line of the rescan backup flip flop 206. The rescan backup flip flop 206 stays set from the end of the fast scan line immediately following the generation of the capture pulse until the rescan counter reaches the count of 84. The $\overline{Q}$ output line of the rescan backup flip flop 206 is connected to output line RBU which is utilized to move the slow scan location of the beam an additional seven microns back so that the start of rescan will start sufficiently back that the entire cell will be included in the rescan.

The rescan sweep flip flop remains set during the period that the rescan counter reaches the count of four until the rescan counter reaches the count of 84 when the rescan sweep flip flop is reset by enabling of gate 220 which is connected to the reset input of the flip flop 208 and thereby causes the reset thereof as the output of gate 220 goes low. The Q output line of the rescan flip flop 208 goes to output line RS which is utilized to start a ramp generator which moves the beam in the slow scan direction 20 microns in the period that the fast scan counter recycles 80 times.

The finish rescan flip flop 210 is simultaneously set at the same time that the flip flop 208 is reset to maintain the enabling of gate 230 and thereby prevents the resetting of the rescan counter 204 until it reaches the count of 96. At the time that the counter reaches the count of 96 AND gate 222 is enabled and thereby causes the finished rescan flip flop 210 to be reset thereby disabling gate 230 and resetting the rescan counter 204. The compute flip flop 212 is set by the enabling of AND gate 222. The compute flip flop remains set until the transfer time required for the transfer of information from the pattern recognition unit to the computer is sufficient to enable recognition of the pattern by the computer. This is indicated by a signal on the recognition line which resets the compute flip flop 212.

Figure 12:
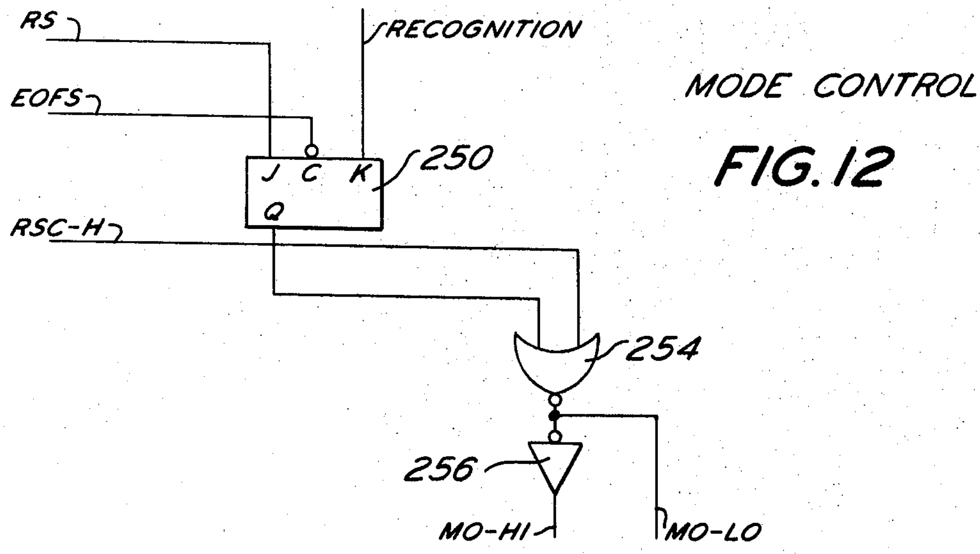
FIG. 12 is a schematic block diagram of the mode control.

Mode control circuitry is shown in FIG. 12. The mode control circuitry includes flip flop 250, an OR gate 254 and an invertor 256. The C input of the flip flop 250 is connected to the EOFS line, the J input is connected to the RS line, the K input is connected to the recognition line from the computer, and the Q output line is connected to the input of AND gate 252. The RS line is also connected to an input of OR gate 254. The RSC-H line is connected to the other input of OR gate 254. The output of OR gate 254 is connected to an invertor 256 and to the MO-LO line. The output of invertor 256 is the MO-HI line.

The operation of the mode control is as follows:

During a search mode, flip flop 250 is in the reset state and the signal on the RSC-H line is low. Accordingly, OR gate 254 is disabled causing the MO-LO line to be high and the MO-HI line to be low. The RSC-H line goes high when the first EOFS pulse is received after a capture is made. The high signal on RSC-H enables OR gate 254 causing the MO-HI line to go high and the MO-LO line to go low. The flip flop 250 remains in the reset condition until the line RS goes high when the count of four is reached in the rescan counter and the pulse signal on line EOFS is generated at the end of the fast scan causing the setting of flip flop 250. When flip flop 250 is set it continues to enable OR gate 254 until the mode flip flop 250 is reset by receipt of the recognition signal which is received on the K input of flip flop 250. Thus, if a recognition signal is not received before the count of 96 is reached in the rescan counter 204 (FIG. 11), the MO-LO signal stays low and prevents a search mode from being started.

Figure 13:
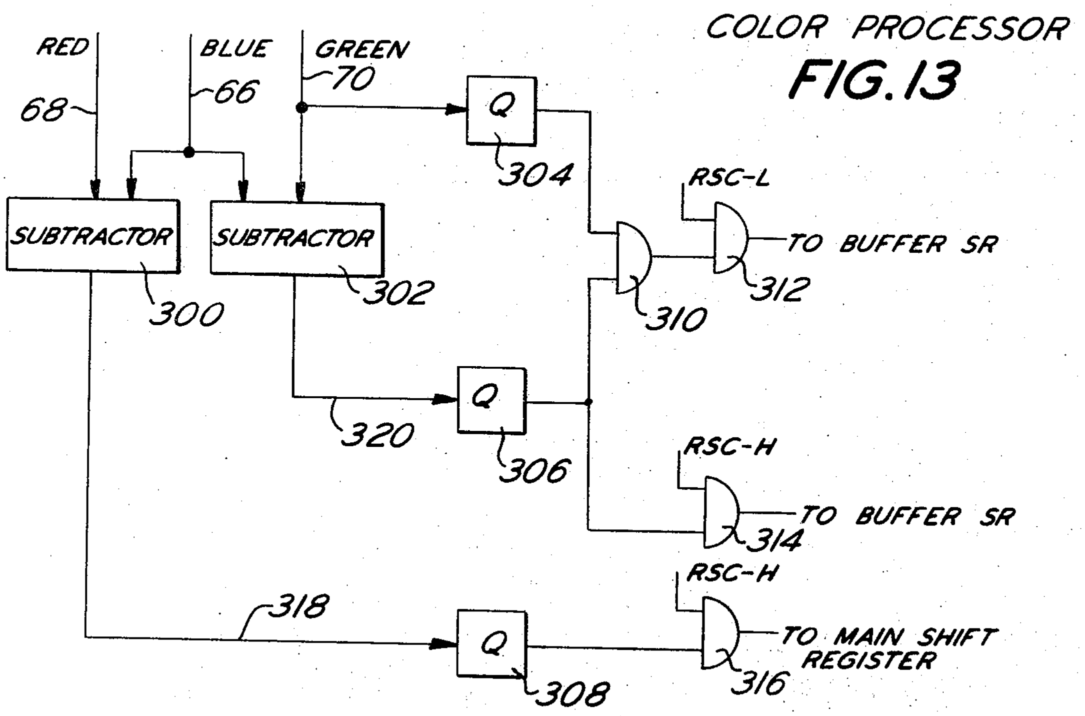
FIG. 13 is a schematic block diagram of the color processor.

The color processor is shown in FIG. 13. The color processor includes a pair of subtractors 300, 302, three quantizers 304, 306 and 308 and four AND gates 310, 312, 314 and 316. The subtractor 300 receives the red and blue signals from lines 68 and 66 of the light component separator, subtractor 302 receives the blue signal and the green signal on lines 66 and 70, respectively. The difference signal from subtractor 300 is applied to the input of the quanitizer 308 via line 318, the difference signal from subtractor 302 is provided via line 320 to quantizer 305, the output signal from the green input line 70 is also provided to quantizer 304. The quantizer 304 and quantizer 306 are connected to the input of AND gate 310, the output of AND gate 310 is connected to the input of AND gate 312. The remaining input to AND gate 312 is the RSC-L input line. Quantizer 306 is connected to the input of AND gate 314 as well as AND gate 310. The AND gate 314 also includes an input line from RSC-H. Quantizer 308 is connected to the input of AND gate 316. The remaining input line is also connected to RSC-H. In operation the color processor enables preprocessing of the signals from the photomultiplier prior to their use by the pattern capture a pattern recognition circuitry.

During the search mode of operation the line RSC-L is high thereby passing the signal from AND gate 310. AND gate 310, in order to be enabled, requires that the quantizer 304 and quantizer 306 have reached their threshold level. The blue-green subtractor 302 provides a difference signal which substantially reduces the amount of red cell information present in the signal. Thus, the reaching of the threshold level in quantizer 306 indicates that a red blood cell is not present. The reaching of the quantizing threshold level in quantizer 304 indicates that this signal is dark enough to be a nucleus of a white blood cell but not the cytoplasm. This treshold level can also be reached by platelets. Thus, substantially the only information which would be provided via gate 310 and to gate 312 is that which is generated by the scanning of a white blood cell nucleus or a platelet. When the system is in the rescan mode the RSC-H signal is high. For classification the preferred quantized signal is the blue-green differential which is provided by the quantizer 306. Thus, the signal is passed via AND gate 314 to the buffer shift register during rescan for classification purposes by the pattern recognition system.

It should be understood that not only is the blue-green signal utilizable but also the green signal as well as the red-blue differential signal provided at the output of subtractor 300 and quantizied by quantizer 308 and, as indicated at the bottom of FIG. 13, the signal from AND gate 316 is provided to the main shift register. It should also be understood that more than one MOS shift register comprised of a plurality of 128 bit shift registers can be provided. Also, as is also well known in the art, a plural parallel bit main shift register may be provided wherein plural levels of quantized signals can be simultaneously examined by the pattern recognition circuitry. Thus, each of the color signals and difference color signals may be processed simultaneously during rescan.

Figure 14:
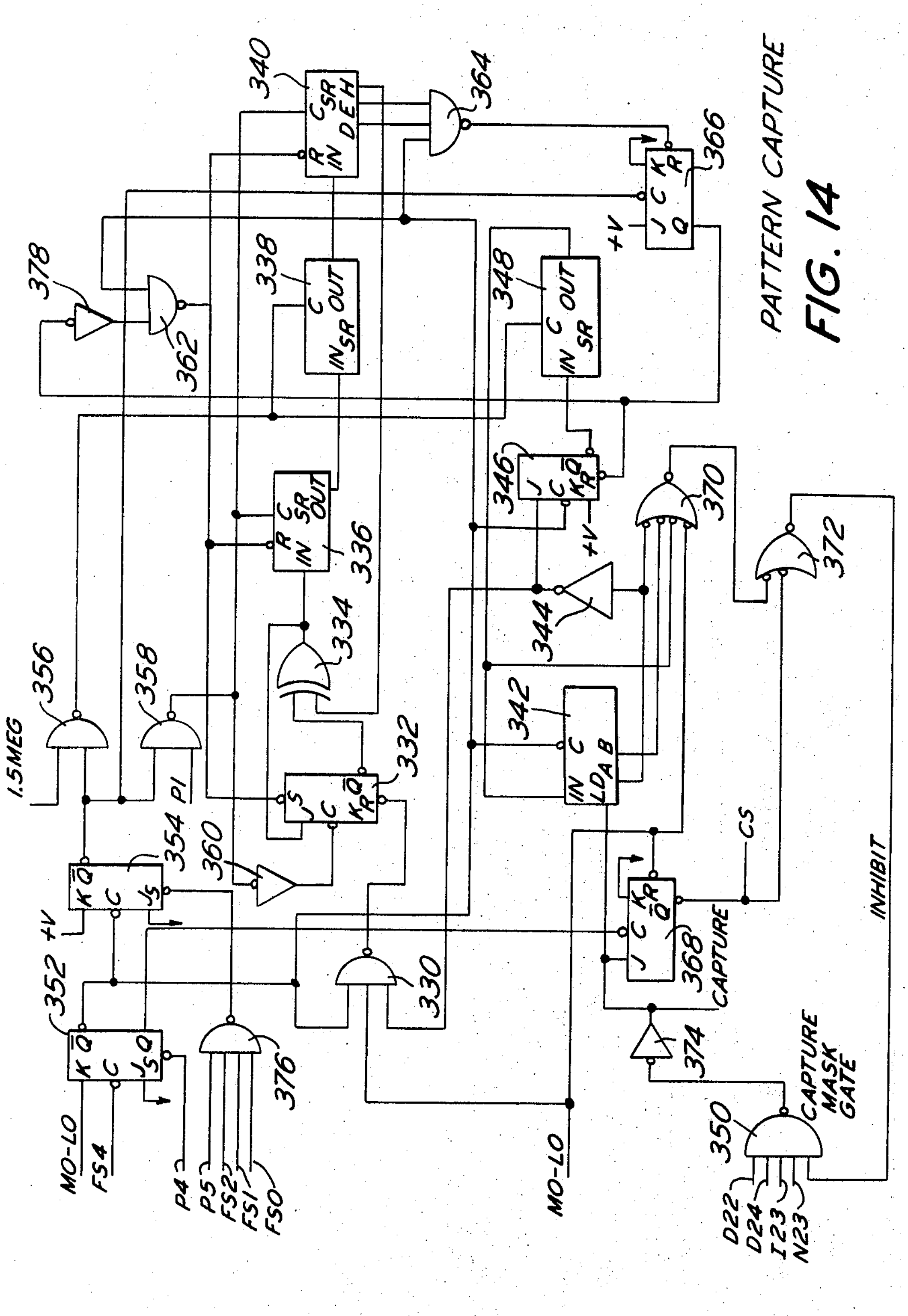
FIG. 14 is a schematic block diagram of the pattern capture circuitry.

The pattern capture circuitry is shown in FIG. 14. The pattern capture circuitry includes a capture location store and counter which is comprised of AND gate 330, flip flop 332, an exclusive OR gate 334 and three shift registers 336, 338 and 340. The pattern capture also includes a fast scan area divider which is comprised of a shift register 342, an invertor 344, a flip flop 346 and shift register 348.

The pattern capture circuitry further includes the capture mask gate which is comprised of an AND gate 350. The timing circuitry associated with the capture location stored and counter comprises flip flop 352, flip flop 354, AND gate 356, AND gate 358 and invertor 360. The circuitry for determining and causing the end of the pattern capture circuitry cycle includes AND gate 363, AND gate 364 and flip flop 366. The circuitry which inhibits a capturing of either the same cell or another cell within the same area that the previous white cell was captured or in adjacent areas includes a capture storage flip flop 368, OR gate 370, OR gate 372 and invertor 374. Cooperating with the timing circuitry is an AND gate 376.

The MO-LO line is connected to the K input of flip flop 352, an input of AND gate 330 and also to the reset inputs of flip flop 368 and an input of OR gate 370. The C input of flip flop 352 is connected to the output of the fast scan counter line FS4. The signal on FS4 goes low every 32 counts of the fast scan counter. Thus, since a search scan is 640 fast scan counts, the flip flop 352 is set twenty times during a fast scan beam in the search mode. The set input of flip flop 252 is connected to the P4 line from the decoder which causes the flip flop 352 to be set immediately upon the next 1.5 megacycle pulse on line P4. The $\overline{Q}$ output line of flip flop 352 is connected to an input of AND gate 330, the clock input of flip flop 354, the clock input of shift register 342, the clock input of flip flop 346 and an input of AND gate 362.

The Q output line of flip flop 352 is connected to the clock input of flip flop 368. The J input of flip flop 352 is connected to ground. Flip flop 354 has its K input connected to +V, the clock input is connected to the $\overline{Q}$ output line of flip flop 352, the J input is connected to ground, the set input of flip flop 354 is connected to the output of AND gate 376 and the $\overline{Q}$ output line of flip flop 354 is connected to an input of and gate 356, an input of AND gate 358 and to the clock input of flip flop 366. The second input to AND gate 356 is the 1.5 megacycle pulses which are used to shift the main shift register. The second input of AND gate 358 is the P1 pulses from the output line of the decoder in the basic timing which provides 1.5 megacycle pulses during phase 1. The outpuot of AND gate 356 is connected to the clock input of both shift registers 338 and 348. The output of AND gate 358 is connected to the input of invertor 360, the clock input of shift register 336 and the clock input of shift register 340.

The inputs of AND gate 376 are connected to the output line P5 of the decoder of the basic timing and to output line FS0 FS1 and FS2 of the fast scan counter. Since the output of AND gate 376 is connected to the input of flip flop 354, the flip flop 354 is opened up for a period of seven 1.5 megacycle pulses since the fast scan counter is counted at a 1.5 megacycle rate. The AND gate 330 receives not only the $\overline{Q}$ output line of flip flop 352 and the MO-LO signal on the MO-LO input line but also receives an input from the output of invertor 344. The output of AND gate 330 is connected to the reset input of flip flop 332. AND gate 362 receives its input from the Q output line of flip flop 366 and the $\overline{Q}$ output line of flip flop 352. The flip flop 332 of the capture location store and counter has its C input connected to the output of invertor 360, the J input connected to the output of EXCLUSIVE OR gate 334, its reset input connected to the output of AND gate 330 and its $\overline{Q}$ output line connected to the input of the EXCLUSIVE OR gate 334. The EXCLUSIVE OR, gate receives a second input from the H output line of shift register 340. In addition to feeding out one of its output lines to the J input of flip flop 332 the EXCLUSIVE OR gate output line is also connected to input line of shift register 336. Shift register 336 is a five bit shift register which receives its input pulses from the output line of EXCLUSIVE OR gate 334. The clock input line of the shift register 336 is connected to the output of AND gate 358. The output line of shift register 336 is connected to the input line of shift register 338. Shift register 338 receives the output signals from shift register 336 and its clock input line is connected to the output line of AND gate 356. The shift register 338 is a 128 bit shift register and the output line is connected to the input of shift register 340.

Shift register 340, in addition to receiving the output signals from shift registers 338, has its reset input connected to the output of AND gate 362, its clock input connected to the output of AND gate 358, its D and E output lines are connected to the input of AND gate 364 and its H output line is connected to the second input of EXCLUSIVE OR gate 334. The shift register 340 is an eight bit shift register with the output lines D and E representing the fourth and fifth stages respectively of the shift register and the H output line representing the eighth stage output line of the shift register. The remaining input of AND gate 364 is the $\overline{Q}$ output line of flip flop 352.

The shift register 342 is connected as a two bit serial shift register. The input line to shift register 342 is connected to the output line of shift register 348. The load input line (LD) of shift register 342 is connected to the output of invertor 374. The clock input line is connected to the $\overline{Q}$ output line of flip flop 352. The A output line which represents the first stage of the shift register 342 is connected to a first input of OR gate 370 and to the invertor 344. The B output line of the shift register 342 is connected to another input of the OR gate 370. The output of invertor 344 is connected to the J input line of flip flop 346 and to the input of AND gate 330. Flip flop 346, in addition to receiving the output of invertor 344 at the J input, has the C input line connected to the $\overline{Q}$ output of flip flop 352, the K input connected to +V and the $\overline{Q}$ output line is connected to the input line of shift register 348. Shift register 348 is a 128 bit shift register which receives its clock pulses from the output of AND gate 356. The output line of shift register 348 is connected to the input line of shift register 342. The output of shift register 348 is also connected to the third input of the OR gate 370. The fourth input of the OR gate 370 is connected to the MO-LO line. The output of OR gate 370 is connected to an input of OR gate 372. OR gate 372 also receives the input from the $\overline{Q}$ output line of the capture flip flop 368. The J input line of flip flop 368 is connected to the output line of invertor 374. The C input line of flip flop 368 is connected to the Q output line of flip flop 352. The K input of flip flop 368 is connected to ground and the rest input of flip flop 368 is connected to the MO-LO line.

The output of OR gate 372 is connected to an input of the capture mask gate 350. The remaining input lines to the AND gate 350 are output lines D22, D24, I23 and N23 from the aperture shift register of the main shift register in FIG. 7.

The flip flop 366 which is used to terminate the pattern capture cycle is connected as follows:

The Q output line is connected to the input of AND gate 362 and to the rest input of flip flop 346. The J input is connected to +V, the C input is connected to the $\overline{Q}$ output line of flip flop 354 and the K input is connected to ground. The reset input is connected to the output of AND gate 364.

The operation of the pattern capture circuitry is as follows:

During the search mode of operation the MO-LO line is high which thereby causes the flip flop 352 to be reset every 32 counts in the fast scan counter. That is, the fast scan counter line FS4 goes low every thirty-two 1.5 megacycle counts. The flip flop remains set only until the next 1.5 megacycle pulse on line P4 during phase 4 of the 1.5 megacycle pulses. When the system is in a rescan mode of operation, the MO-LO line is low thereby preventing the flip flop 352 from being reset and causing pulses every 32 counts in the fast scan counter. Each time flip flop 352 is set, the $\overline{Q}$ output line goes low thereby causing the flip flop 354 to be reset. The flip flop 354 stays reset for 7 counts until the AND gate 376 is enabled 7 fast scan counts later and causes the flip flop 354 to be reset.

The AND gates 356 and 358 are enabled seven times during the time that flip flop 354 is in the reset state. The 1.5 megacycle pulses to AND gate 356 cause a different enabling period than the P1 pulses to gate 358 because the P1 pulses are positive in a different phase of the 1.5 megacycle pulse.

Shift registers 336, 338 and 340 are effectively a 140 bit shift register which is constantly recirculated. Normally, the shift register comprising shift registers 336, 338 and 340 have zeros recirculating throughout the 140 bits of the shift register. Each 7 bits of the 140 bit shift register effectively represent an area of 32 counts in the fast scan direction. Thus, when information is put into any one of the 20 7 bit locations, that information in the 7 bits represents the location of the capture which is stored as the shift register is recirculated. The flip flop 332, in combination with the exclusive OR gate 334 effectively increment the count in the seven bits each time the seven bits are recirculated completely through the 140 bits represented by shift registers 336, 338 and 340.

There is thus a complete recirculation of the 140 bit shift register for each complete fast scan cycle in the search mode. The 140 bit shift register is thus synchronized with the fast scan counter.

The fast scan area divider is also effectively a 140 bit shift register as a result of the operation of shift registers 342 and 348. Shift register 342 normally has ones recirculating through the shift register as a result of the fact that the input line to the J input of flip flop 346 is normally low in the search mode until a capture has occured. Until that time, the output signal on the $\overline{Q}$ output line of flip flop 346 is normally high which thereby causes the shift pulses to shift register 348 on the clock input line to shift ones through the 128 bit shift register 348. As soon as the capture mask gate 350 is enabled, the shift registers 342 and 348 operate to divide the fast scan into twenty discrete areas so that the capture mask can be inhibited from making any further detections of white cells in the area in which capture is made or the adjacent areas during the next twenty-four lines in the slow scan direction. When AND gate 350 is enabled it causes the output line thereof to go low which is inverted to a high input pulse on the J input of flip flop 368 and to the load input of shift register 342. As soon as a zero is put into the first stage of the shift register 342, output line A causes the J input of flip flop 346 to go high and also causes AND gate 330 to be enabled as soon as the flip flop 352 is reset.

Upon the first resetting of flip flop 352 after capture has occurred, the Q output line first goes negative and thereby causes the capture storage flip flop 368 to be set. The $\overline{Q}$ output line then goes low after the flip flop is set again causing shift register 342 to shift the zero from the first stage to the second stage thereby causing the B output line to go low and the flip flop 346 to be primed to be set, on the next negative going pulse from the $\overline{Q}$ output line of flip flop 352. The setting of flip flop 352 also causes the enabling of AND gate 330 which causes the resetting of flip flop 332. When the flip flop 332 is reset the $\overline{Q}$ output line thereof goes high which causes the enabling of EXCLUSIVE OR gate 334 since the remaining input to the OR gate is a low input from the shift register 340. The high output signal on the output line of EXCLUSIVE OR gate 334 thus provides a one input to the first stage of shift register 336 when the next 1.5 megacycle pulse during phase 1 enables gate 358 and thereby causes the setting of flip flop 332 and the placement of a one input in the first stage of shift register 336.

The setting of the flip flop 346 in the fast scan area divider causes the $\overline{Q}$ output line of flip flop 346 to go low and thus seven zero bits are placed into shift register 348 as the clock input thereof receives seven pulses from AND gate 356 until the next resetting of flip flop 352 causes the flip flop 346 to be reset. The seven zero bits are then shifted through the shift register 348.

Although shift register 348 is only 128 bits long and the shift register 342 is only two bits long, there is nonetheless the operation of a shift register of 140 bits long simulated thereby. The reason is that shift register 342 effectively adds seven bits to shift register 348 since the shift register 342 is shifted only once every 32 counts instead of seven times every 32 counts as is shift register 348. Thus, the effective length of shift register 348 and 342 is 135 bits long. Even though 128 pulses are required to shift all of the information through shift register 348, it only requires one bit at the output of shift register 348 to load a zero into the shift register 342. That is, since the shift register 342 had information shifted in by the negative going pulse on the clock input line from the switching of flip flop 352, only the last bit in the shift register 348 must be a zero in order to accomplish this since the negative going signal to the clock input line of shift register 342 occurs during the first of the seven 1.5 megacycle clock pulses which shift the shift register 348.

As soon as the zero has been inserted into shift register 342 it remains there for seven counts prior to being placed into the flip flop 346 to provide the second set of counts in the first seven stages of the shift register 348. Thus, the shift registers 342 and 348 act to effectively divide the fast scan direction into 20 discrete areas. In addition, each time that the 7 bits corresponding to the location of the capture in the shift registers 336, 338 and 340 is recirculated, it is recirculated through the EXCLUSIVE OR gate 340 which is connected to the input of shift register 336.

Thus, after the one bit in the seven bits is recirculated through shift registers 336, 338 and 340, the 1 bit is applied to the EXCLUSIVE OR gate 334 after it has been recirculated through the 140 bits of the shift register. However, since the zero bits in the shift register 348 have been provided to the input of shift register 342 in synchronism with the 7 bits floating through shift register 338 and 340, the A output of shift register 342 causes the AND gate 330 to be enabled via the invertor 334. The enabling of AND gate 330 causes the flip flop 332 to be reset and thereby causes a one to be provided at the other input of exclusive OR gate 334 at the time that the first bit of the shift register has recirculated to the EXCLUSIVE OR gate 334. Since the EXCLUSIVE OR gate is enabled only when one of the inputs is at a high level, a zero is then placed in the first stage of the shift register 336 by the clock pulse from AND gate 358. Also, because the output of the EXCLUSIVE OR gate is low, the flip flop 332 does not set upon the clock pulse being applied by the invertor 360 to the clock input of flip flop 332.

Since the one bit has been shifted out of shift register 340, the first input to the EXCLUSIVE OR gate 334 now goes low. However, since the input from the $\overline{Q}$ output line of flip flop 332 remains high the EXCLUSIVE OR gate shifts a one bit into the shift register 336 during the next clock pulse from AND gate 358 thereby providing a one in the second bit of the 7 bits which are representative of the location of the capture of a white cell in the fast scan direction. After another complete recirculation of the 140 bits in the shift registers 336, 338 and 340, the first bit of the seven bits provided to the EXCLUSIVE OR gate 334 is a zero and therefore since the flip flop 332 has been reset again the high signal on the $\overline{Q}$ output line of flip flop 332 causes the enabling of the EXCLUSIVE OR gate and a placement of a one in the first position of the seven bits into shift register 336.

The second bit of the seven bits provided by shift register 340 is a 1 bit thereby providing a high signal to the EXCLUSIVE OR gate 334 from shift register 340 but, since the flip flop 332 was set by the high output previously on the output of EXCLUSIVE OR gate 334, the second input to the EXCLUSIVE OR gate is a low input and thereby causes a second enabling of the EXCLUSIVE OR gate 334 thereby providing two ones in the first two bits of the seven bits representative of the capture location.

During the next 140 bit recycling of the shift registers 336, 338 and 340, the first bit of the seven bits causes the occurance of a high signal on both input lines of the EXCLUSIVE OR gate as the flip flop 332 is reset again by the location of a zero in the first stage of shift register 342. Thus during the first bit applied to shift register 336 the output of EXCLUSIVE OR gate is low thereby providing a zero bit to the first of the seven bits provided to the shift register 336. During the second bit the Q output line remains high since the flip flop has not been set by the enabling of the EXCLUSIVE OR gate 334 thereby causing the second bit to be placed into the shift register 336 by EXCLUSIVE OR gate 334 to be another zero. Since only two ones were present in the last stages of shift register 340 the next bit provided to the last stage of shift register 340 causes a low signal to be applied to the first input of EXCLUSIVE OR gate 334 and only a single high signal is provided from the $\overline{Q}$ output line of flip flop 332 thereby enabling EXCLUSIVE OR gate 334 and putting a one into the third bit of shift register 336. The count in the seven bits of the shift register 336 is now 001 which is the binary representation of a decimal 4 indicating that this is the fourth recirculation of the 7 bits represented of the capture location being shifted through shift register 336, 338 and 340.

When the count has reached 24 in the 7 bits, during the 20 fourth circulation of these seven bits, the shift register 340 ultimately receives the count of 24 in the last 7 bits of the shift register 340 which causes the AND gate 364 to be enabled when the count of 24 is in shift register 340 at the time that the flip flop 352 is reset by the FS4 line. When AND gate 364 is enabled, the flip flop 366 is reset thereby causing the resetting of flip flop 346 and the enabling of AND gate 362 via invertor 378. When AND gate 362 is enabled the shift register 340 is reset thereby removing the count of 24 from the 7 bits in shift register 340 and the resetting of flip flop 346 causes a loading of ones into the shift register 348, instead of receiving the zeros from shift register 342. Thus, effectively, the shift register 348 is reset to its original condition in a search mode after the seven bits representative of the capture location have been circulation through shift registers 336, 338 and 340 24 times.

During the time that the zeros are recirculating through the shift register 348 and shift register 342 comprising the fast scan area divider, the zeros at the location of the pattern capture cause the OR gate 370 to be enabled which in turn causes OR gate 372 to be enabled which causes the inhibit signal on the capture mask gate 350 which prevents an additional capture during the twenty-four fast scan lines of search. It should be noted that the capture mask gate is inhibited not only during the area that the capture mask was enabled, but also in the adjacent areas on each side of the area in which the capture was made. That is, the OR gate 370 is enabled not only by a zero in the first stage of shift register 342 but also the second stage output line B is also connected to OR gate 370 which thereby causes the enabling of the OR gate 370 when the zero is in the second stage of shift register 342. In addition, prior to the zero being loaded into shift register 342, the output of the last stage of shift register 348 is also connected to the OR gate 370 thereby disabling the OR gate 370 in the area prior to the area in which the capture is made.

When capture is originally made and AND gate 350 is enabled, the capture storage flip flop 368 is set upon the first resetting of flip flop 352. As soon as the capture flip flop 368 is set, the $\overline{Q}$ output line thereof goes low causing the OR gate 372 to be enabled to inhibit the capture mask gate 350 from being enabled as long as the capture storage flip flop remains set. What this means is that if a cell is captured in the upper portion of the fast scan direction no further captures can be made for the entire fast scan line. Thus, for example, in FIG. 2 the white cell 102 is in the area of the fast scan direction between the 30 and 48 micron distance in the fast scan direction. Thus, the fast scan counter would have only reached somewhere between 60 and 96 when the white cell 102 is detected. As soon as the capture storage flip flop 368 is set by the capturing of the pattern in the area between 64 and 96 of the fast scan count, the storage flip flop 368 enables the OR gate 372 and thereby inhibits the further capture of a pattern during the entire time that it required to complete the count of 640 in the fast scan counter.

As soon as the fast scan count reaches 640 the rescan mode of operation is initiated thereby causing the MO-LO signal to go low and thereby reset the flip flop 368. Thus, the function of the capture storage flip flop 368 is to prevent a second capture during the fast scan line that must be completed after capture is made.

There is thus a partial circulation of the seven bits representing the capture location in the shift registers 336, 338 and 340 when the low signal on the MO-LO line to flip flop 352 causes no further pulses to be provided to either of the capture location storage registers and counter and the fast scan area divider until the rescan mode of operation has been completed and classification of the white cell has been made. Thus, during the next 24 lines no further white cells can be captured in the area where the previous white cell was captured. It should also be understood that the fast scan area divider and the capture location store and counter can simultaneously process more than one capture. That is, if a second white cell is captured or detected in another area of the fast scan direction within the next 24 lines, seven bits representative of the capture location store comprising shift registers 336, 338 and 340 would be incremented to a one and a zero would be loaded into shift register 342 in another portion of the 140 bits circulating through the shift register.

Thus, while the count in the seven bits representative of the first cell scanned would be incremented by the flip flop 332 in combination with EXCLUSIVE OR gate 334, the second 7 bits which represent the area that the second cell was captured in would also be incremented by the flip flop 332 in combination with EXCLUSIVE OR gate 334 as these bits are recirculated in the capture location storage register. In view of the fact that 20 discrete areas are defined by the fast scan area divider, the pattern capture circuitry could simultaneously process six captures. That is, each capture inhibits three areas. Thus, six captures would inhibit eighteen total areas preventing any further capture.

Figure 15:
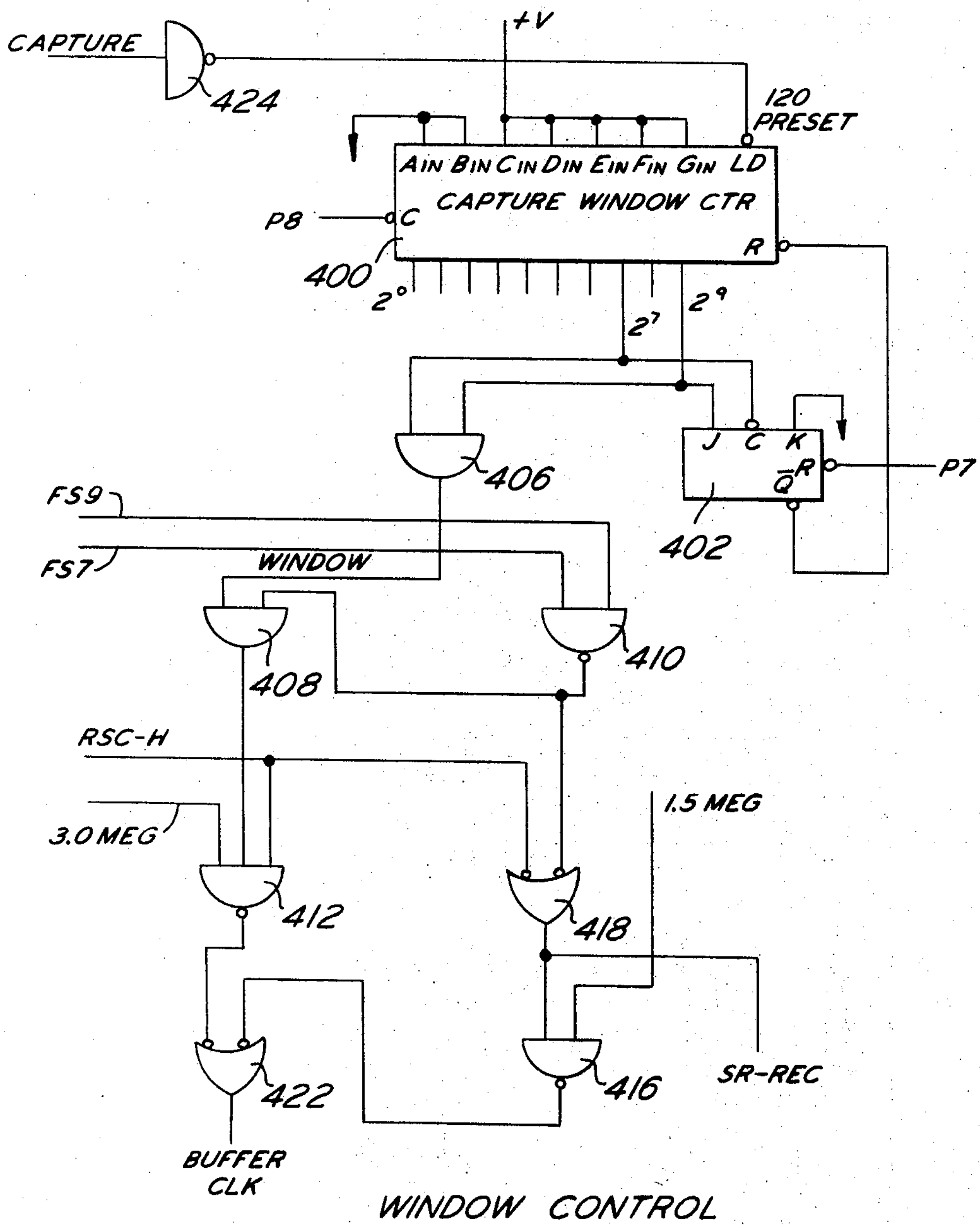
FIG. 15 is a schematic block diagram of the window control.

The window control circuitry is shown in FIG. 15. The window control basically comprises a capture window counter 400, flip flop 402, AND gates 406, 408, 410, 412 and 416 and OR gates 418 and 422. The window control also includes an invertor 424. The input of the invertor 424 is the capture signal from the output of invertor 374 in the pattern capture circuitry of FIG. 14. The capture signal goes high immediately upon the detection of a white cell. The output line of invertor 424 is connected to the load input of the capture input counter 400 and causes the capture window counter to be preset to a count of 120 as soon as the capture is made. The capture window counter includes inputs to the first and second stages which are labelled AIN and BIN, respectively, which are connected to ground. The capture window counter also includes inputs CIN, DIN, EIN, FIN and GIN which are connected to the third through seventh stages of the capture window counter and each of these inputs are connected to +V.

The capture window counter is a conventional binary counter which can be preset in accordance with the signals provided on the input lines to the stages thereof. Thus, when the low input is provided to the load input of the capture window counter it presets each of the stages in the counter in accordance with the input signal provided to the stages. Thus, effectively, a one is placed into the stages 3 through 7 by the high input signal on lines CIN through GIN and a zero is placed in the first two stages by the ground input to AIN and BIN when the low signal is applied to the load input of the capture window counter. This provides a binary count of 120 in the capture window counter.

The capture window counter also includes a C input which is connected to the output line P8 of the timing decoder. The capture window counter is thus stepped at a rate of 1.5 megacycles by the signal on line P8. The capture window counter also includes a reset input which resets the capture window counter to zero at the reaching of the count of 767 in the counter.

The output lines of the capture window counter are respectively labelled $2^0$ through $2^9$. The $2^7$ output of the capture window counter is connected to an input of AND gate 406 and to the C input of the flip flop 402. The $2^9$ output of the capture window counter 400 is connected to the other input of AND gate 406 and to the J input of flip flop 402. The output of AND gate 406 is connected to the input of AND gate 408 via a line which is labelled WINDOW. The reasons for the labelling of the WINDOW line as such is due to the fact that the AND gate 406 is enabled during the count of 640 to 767 in the capture window counter. That is, the $2^7$ and $2^9$ output lines of capture window counter both go high at the count of 640. The $2^7$ line stays high for another 127 counts and then goes low thereby disabling gate 406 and thereby causing the end of the high signal on the window line. This signal, when it is high, effectively enables the transfer of date from the buffer shift register into the main shift registers for classification analysis by the pattern recognition system.

The flip flop 402, in addition to receiving clock pulses from the $2^7$ output line of the window counter has its J input connected to the output line $2^9$ of capture window counter 400. The K input is connected to ground and the R input is connected to output line P7 of the timing decoder. The $\overline{Q}$ output line of flip flop 402 is connected to the reset input of capture window counter 400. Gate 408 has one of its input lines connected to the window line and a second input connected to the output of AND gate 410. The output line of AND gate 408 is connected to an input of AND gate 412. The AND gate 410 has both of its inputs connected to the outputs of the fast scan counter and specifically to lines FS9 and FS7 thereof. Gate 410 is thus enabled during the count of 640 to 767 in the fast scan counter. The output of gate 410 is connected to the input of gate 408 which thus causes a disabling of the gates 408 by the low signal on the output of gate 410 when the period in the fast scan counter from 640 to 767 coincides with a portion of the period from 640 to 767 in the capture window counter.

Gate 410 is thus provided to inhibit the transfer of information to the main shift register if a capture of a pattern has been obtained too close to the lowermost edge of the field in the fast scan direction to prevent the classification of an incomplete pattern. The output of AND gate 410 is also connected to an input of OR gate 418.

The RSC-H line from OR gate 230 in FIG. 11 is also connected to an input of OR gate 418 and an input of AND gate 412. The third input to AND gate 412 is the 3.0 MEG line which provides pulses at a 3.0 megacycle rate to the AND gate 412. The output of AND gate 412 is connected to an input of OR gate 422. The output of OR gate 418 is connected to an input line of gate 416. The other input of AND gate 416 is the 1.5 megacycle line. The output of both AND gate 412 and AND gate 416 are provided to the input lines of the OR gate 422 which is connected to the BUFFER-CLK line which is fed to the clock input of the buffer shift register. The output line of the OR gate 418 is connected to the SR-REC line which is connected to the R input line of shift register SR1 through SR26.

The capture window counter 400 is stepped at a rate of 1.5 megacycles as is the fast scan counter 190. In fact, both are stepped in the same phase by the P8 pulses from the decoder in the main timing. The purpose of the capture window counter is to establish a coordinate set to allow sampling and scanning of the white cell for the purpose of classification. it will be remembered that at the time the capture pulse is generated, not only is the capture window counter preset to 120, but also, as set forth above in the slow scan direction, the scan is backed up four lines to correspond to the distance of the capture mask and the slow scan counter is then fixed. During the rescan a minor scan is generated about this slow scan position. As will hereinafter be seen, this minor scan is generated by a slow scan ramp generator 20 microns to the right in the slow scan direction which moves from a point 7 microns to the left of the four line backup position.

In the fast scan direction the presetting of the capture window counter to 120 causes the pattern capture to be at the center of the scanning in the classification mode. That is, in both the search and the rescan mode. The difference is that a 128 count additional period is utilized for the blanking interval between the counts of 640 and zero. This enables the capture window counter to be decoded to establish a window for sampling and shifting the data in the quantized video into the shift register during the rescan mode for cell classification.

It will be remembered that a pattern is captured in the aperture shift register comprised of shift registers SRA to SRZ. The center position in the fast scan direction of the capture pattern in the aperture is position 23 of shift registers SRD, SRI, and SRN. This position in combination with the extra eight bits (the capture window counter is set to 120 rather than 128) means the bottom of the window is 31 counts from the point of capture.

Since the cell capture window is 64 counts wide, this places the cell in the approximate center of this window. That is, in the rescan mode the cell window appears to be 128 bits long because there are two samples for each count. The two samples for each count is caused by the 3.0 megacycle rate of sampling which is provided to the buffer register via the AND gate 412 and OR gate 422 to BUFFER-CLK line. Although the window line which enables the AND gate 412 is 128 counts long, and therefore enables 256 3 megacycle pulses to be fed to the clock input of the buffer shift register in FIG. 7, the first 128 bits provided to the buffer shift register 150 are shifted out on line 172 and are not used since the shift register SR1 through SR26 has a low input pulse on the R input line to prevent any reception of data from input line 172 to the shift register. The second 128 bits are stored in the buffer shift register and are then fed out to the shift register SR1 at a 1.5 megacycle rate after the window is terminated and during the count of 640 to 767 in the fast. Shift register SR1 receives the data from the buffer shift register since the SR-REC line goes high during the fast scan count of 640 to 767.

Referring back to the window control circuitry in FIG. 15, it can therefore be seen that the window signal, when it is high, causes the enabling of AND gate 412 via AND gate 408 unless AND gate 410 is enabled by the fast scan counter during the same time that the window is generated by the capture window counter. Thus during the window, the AND gate 412 is enabled by the RSC-H line which is high during the rescan to pass the 3.0 megacycle pulses to the buffer shift register via OR gate 422.

When the RSC-H line is low during the search mode of operation, the OR gate 418 is enabled thereby enabling the AND gate 416 to pass 1.5 megacycles pulses to the buffer shift register via OR gate 422 during the search mode of operation. The flip flop 402 controls the recycling of the capture window counter 400. At the count of 640, the $2^9$ output line goes high thereby providing a positive voltage at the J input of flip flop 402. The $2^7$ line of the capture window counter then goes negative after the count of 767 has been reached thereby causing the flip flop 402 to be set causing the output signal on $\overline{Q}$ output line of flip flop 402 to go low and cause the resetting of the capture window counter to zero.

The flip flop 402 remains set for only a short period of time because the next pulse on line P7 causes the flip flop 402 to be reset and thereby removes the reset signal from the capture window counter 400 and enables the next pulse on the P8 line to set a one into the capture window counter. The output line SR-REC which controls the shift registers SR1 through SR26 is high during the entire search mode as a result of OR gate 418 being enabled by the low signal on the RSC-H line during the search mode. The SR-REC signal is high during the rescan mode of operation only at the time that AND gate 410 is enabled which is during the time that the fast scan counter goes from 640 to 767. It can therefore be seen that the enabling of OR gate 418 during both the search mode and the period of 740 to 647 of the fast scan count means that 1.5 megacycle shift pulses are provided to the buffer shift register only during a search mode or during the period of time that the count goes from 640 to 767 in the fast scan counter. The only other pulses that are fed to the shift register during the rescan mode is during the period that the window is open and the 3.0 megacycle pulses are fed by the enabling of AND gate 412 and the passing by OR gate 422 of the pulses to the buffer shift register.

Figure 16:
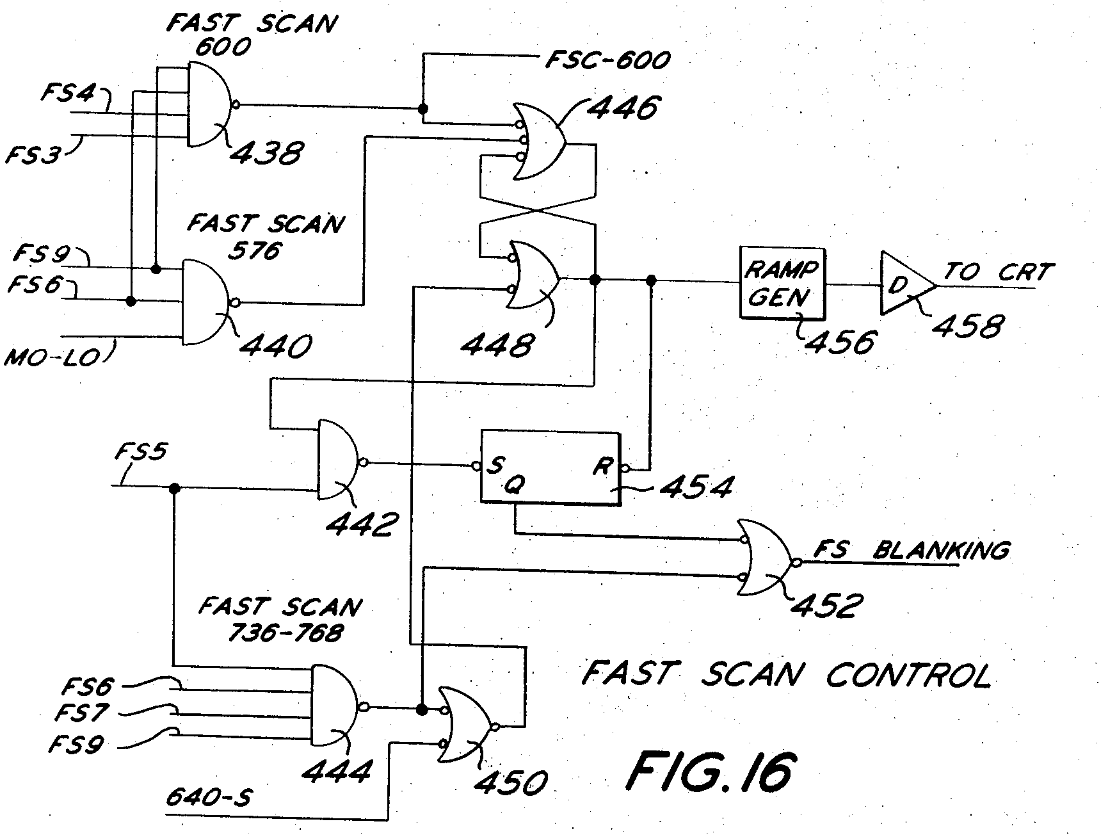
FIG. 16 is a schematic diagram of the fast scan control.

The fast scan control circuitry is shown in FIG. 16. Basically, the fast scan control circuitry comprises AND gates 438, 440, 442 and 444, OR gates 446, 448, 450 and 452, a flip flop 454 and a ramp generator 456 and a drive amplifier 458. The AND gate 438 has its four inputs connected to output lines FS3, FS4, FS6 and FS9 of the fast scan counter. Thus AND gate 438 is enabled when the fast scan counter reaches the count of 600. The output line of AND gate 438 is connected to output line FSC-600 and to an input of OR gate 446. AND gate 440 is connected to two outputs of the fast scan counter, output lines FS9, and FS6. The remaining input of AND gate 440 is connected to the MO-LO line which is high only during the search mode. Thus during the search mode the AND gate 440 is enabled when the fast scan counter reaches the count of 576. The output of AND gate 440 is connected to another input of OR gate 446. OR gate 446, in addition to having inputs from the output lines of AND gates 438 and 440, also has an input line connected to the output of OR gate 448. The output of OR gate 446 is connected to the input of OR gate 448. The second input of OR gate 448 is connected to the output of OR gate 450. The output of OR gate 448 is connected to ramp generator 456. The output of the ramp generator 456 is connected to the input of the drive amplifier 458 which is connected to the vertical deflection coil of the cathode ray tube.

AND gate 442 has an input line connected to the output line FS5 of the fast scan counter which goes high when the fast scan counter reaches the count of 32. The other input of AND gate 442 is connected to the output of OR gate 448. The output of AND gate 442 is connected to the set input of flip flop 454. The AND gate 442 is enabled only when OR gate 448 has been enabled and the FS5 line goes high. The output of AND gate 442 is connected to the set input of flip flop 454. The R input of flip flop 454 is connected to the output of OR gate 448. The Q output line of flip flop 454 is connected to an input of OR gate 452. The remaining input of OR gate 452 is connected to the output of AND gate 444. The output of OR gate 452 is connected to the FS BLANKING line. AND gate 444 is connected to the FS5, FS6, FS7 and FS9 output lines of the fast scan counter. The output of AND gate 444 is connected to the input of OR gate 450. The remaining input to OR gate 450 is connected to the output of the AND gate 192 in the fast scan timing of FIG. 10 labelled the 640–S line. The 640–S line is high whenever the fast scan counter reaches the count of 640 in the search mode.

The OR gates 446 and 448 form a flip flop with the output of the flip flop connected from the output line of OR gate 448 being connected to the ramp generator 456. When the output of OR gate 448 goes high the ramp generator 456 starts a sawtooth wave or ramp voltage generation which is fed via the driver amplifier 458 to the vertical deflection beam of the cathode ray tube and thereby causes a vertical sweep in the fast scan direction.

When the output of OR gate 448 goes low, the volatage on the output of the ramp generator immediately goes towards zero and continues to go to zero until the voltage is high at the output of OR gate 448 and thereby starts another ramp.

During the search mode, the ramp generator causes a vertical sweep during the fast scan count of zero to 576. At the count of 576 AND gate 440 is enabled thereby causing the enabling of OR gate 446 which thereby causes the OR gate 448 to be disabled and thereby provide a low signal to the ramp generator causing a retrace. In the search scan when the count of 640 is reached the 640–S line goes low thereby enabling the OR gate 450 and thereby enabling in turn OR gate 448. When OR gate 448 is enabled the ramp generator 456 starts another ramp at the count of zero in the fast scan counter. The ramp continues until the count of 576 is reached, then there is a retrace at the count of 640 in the fast scan counter or zero, because the fast scan counter is reset at 640 the ramp generator again begins another sawtooth wave to cause another vertical sweep.

In the rescan mode the OR 446 is enabled when AND gate 438 is enabled at the fast scan count of 600. Thus, there is a retrace of the scan line starting at the count of 600. The OR gate 448 remains disabled until the fast scan count reaches the count of 736 which thereby causes AND gate 444 to be enabled which in turn enables the OR gate 450 which enables OR gate 448. Thus, the retrace is terminated at the count of 736 and the ramp generator is again started. The OR gate 448 remains enabled until the fast scan counter again reaches 600 when a retrace line is started by the voltage going towards zero at the output of ramp generator 456.

The reason that the OR gate 448 is enabled at the count of 736 in the fast scan counter during the rescan mode of operation is that the starting of the ramp voltage when the count is 736 enables much greater linearity of the ramp between the count of zero and 600 in the fast scan counter.

Flip flop 454 is reset whenever the OR gate 448 is disabled. When the flip flop 454 is in the reset mode, the OR gate 452 is enabled, which enabling signal is utilized for the purpose of blanking the CRT tube during the retrace time. After the OR gate 448 is enabled, it primes AND gate 442 to be enabled when the count in the fast scan counter reaches the count of 32. In the search mode, flip flop 454 is not set until the fast scan counter reaches the count of 32 and thus between the count of 576 in the fast scan counter until the fast scan counter reaches the count of 32 the beam remains blank. In the rescan mode of operation, the OR gate 452 is controlled by the AND gate 444 which is enabled during the period that the fast scan counter counts from 736 to 768. Until the fast scan counter reaches 736 the OR gate is enabled by the flip flop 454. Thus, the CRT remains blank between the time that the fast scan counter is between the counts of 600 and 768.

Figure 17:
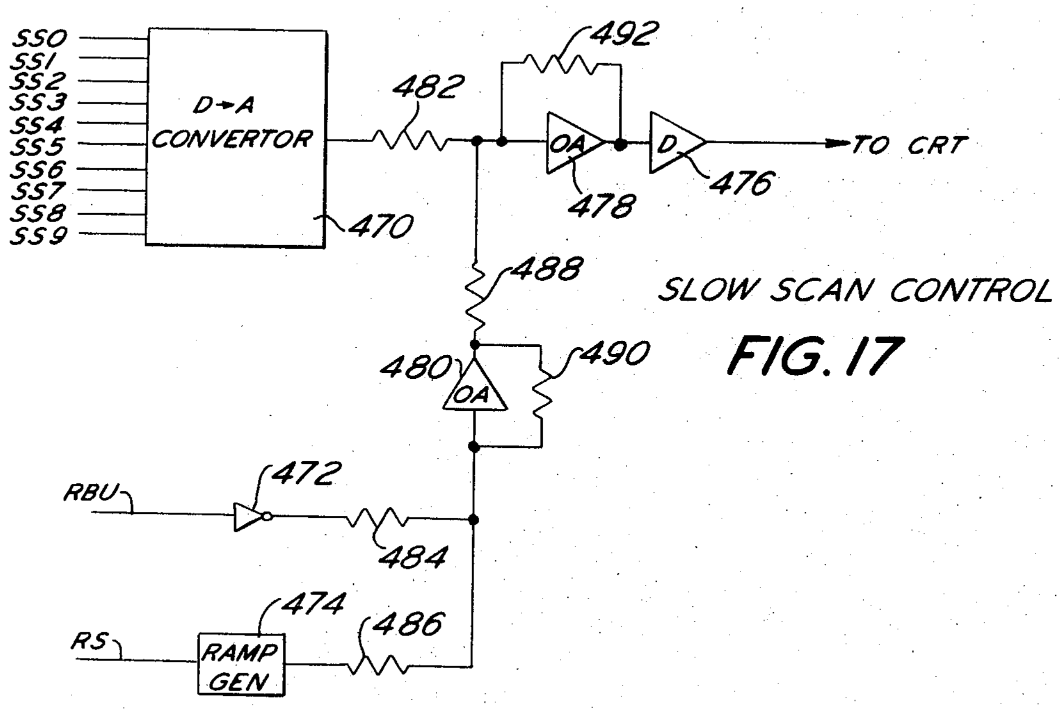
FIG. 17 is a schematic block diagram of the slow scan control.

The slow scan control circuitry is shown in FIG. 17. The slow scan control includes a digital to analog converter 470, an amplifier 472, a ramp generator 474, a driving amplifier 476, a pair of operational amplifiers 478 and 480, resistors 482, 484 486, 488, 490 and 492. The digital to analog convertor has inputs which are connected to the output lines FS0 through FS9 of the slow scan counter 202 in FIG. 11. The digital to analog convertor converts the digital inputs on lines FS0 through FS9 to an analog signal which is provided on its output line which is connected to resistors 482. Resistor 482 is connected to the input of an operational amplifier 478. The operational amplifier has a feed back resistor 492 connected across its input and output terminal. The operational amplifier 478 is connected to the input of a driving amplifier 476, the output of which is connected to the horizontal deflection coil of the cathode ray tube. The input of amplifier 472 is connected to the output line RBU which is connected to $\overline{Q}$ output of the rescan back up flip flop 206 in FIG. 11. The output of the amplifier is connected to a summing resistor 484. Summing resistor 484 is connected to the input of operational amplifier 480. The operational amplifier 480 has a resistor 490 connected across its input and output terminal for feedback. The output of the operational amplifier is connected to the input of operational amplifier 478 by a summing resistor 488. The RS output line from the Q output line of the rescan sweep flip flop 208 in FIG. 11 is connected to the input of ramp generator 474. The output of ramp generator 474 is connected to the input of operational amplifier 480 via the summing resistor 486.

The horizontal deflection coil of the cathode ray tube which controls the location of the beam along the slow scan direction is basically controlled by the slow scan counter 202 in FIG. 11. As the count in the slow scan counter is increased, the voltage applied from the digital analog converter to the operational amplifier 478 is also increased. In the search mode of operation, the slow scan counter is incremented one step for each fast scan and thus the digital to analog converter provides discrete voltage step up for each movement of the beam in the slow scan direction. For each step up of the count in the slow scan counter the beam is translated 1 micron on the field of the blood smear. When the system is in the rescan mode, the output voltage from the digital to analog convertor, representative of the point at which a cell was found, remains constant.

The beginning of a rescan requires that the beam be moved back approximately seven microns before the beginning of the scan line which would cause the capture. This is accomplished by the voltage drive on line RBU which goes to ground and thereby causes a lowering of the voltage to the driver 476. A mini scan is then caused to start from that point seven microns to the left of the position stored by the slow scan counter 202 by the application of a positive voltage on output line RS of the rescan sweep flip flop 208 to ramp generator 474. The voltage applied from the ramp generator via summing resistor 486 and ultimately to the driver 476 causes a movement of the beam in the slow scan direction 20 microns along the field in the blood smear during the period that 80 fast scan lines are completed. As soon as 80 scan lines are complete during the count of 4 to 84 in the rescan counter, the rescan sweep flip flop 208 in FIG. 11 is reset thereby causing the voltage at the input of the ramp generator 474 to be relinquished and thereby enabling voltage at the output of the ramp generator to go towards ground.

Also, when the rescan generator reaches the count of 84, the positive voltage is again applied to the RBU line thereby returning the bias via resistor 484 to the operational amplifier 480 and via summing resistor 488 which enables the beam to return to its original position in the slow scan direction so that a search mode can be resumed at the fast scan line in which a pattern capture of a white blood cell was obtained before the rescan.

Figure 18:
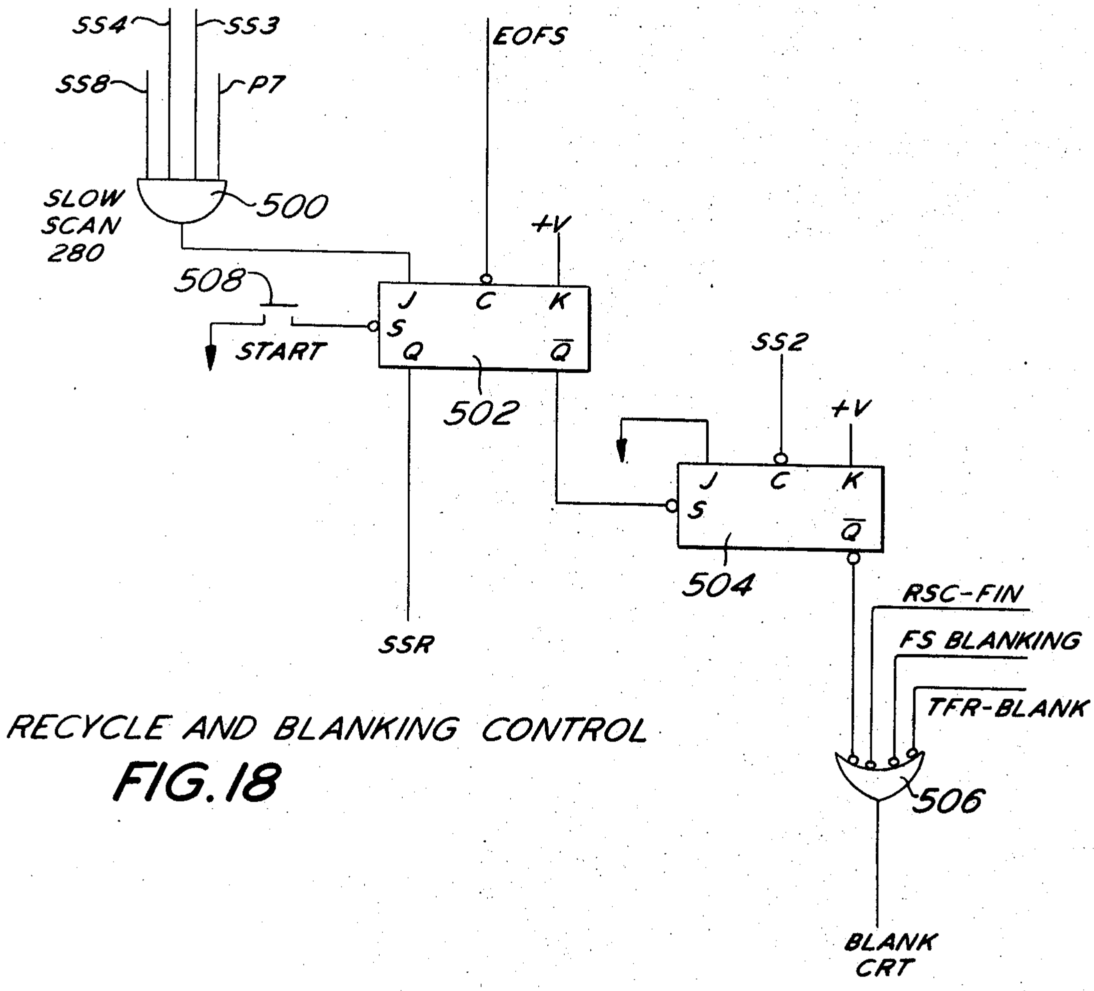
FIG. 18 is a schematic block diagram of the recycle and blanking control.

The recycle and blanking control circuitry is shown in FIG. 18. This circuitry includes an AND gate 500, a flip flop 502, a flip flop 504 and an OR gate 506. The flip flop 502 in combination with flip flips 504 and AND gate 500 act to recycle the slow scan counter 202 in FIG. 11. The input line to AND gates 500 are connected to the output lines SS3, SS4 and SS8 of the slow scan counter 202. The fourth input line to AND gate 500 is the output line P7 of the basic timing decoder. The output of AND gate 500 is connected to the J input of flip flop 502. The flip flop 502 in addition to receiving the signal from the AND gate 500 on the J input is connected to and receives the EOFS signal from the output of the $\overline{Q}$ output line of flip flop 200 in the fast scan timing circuitry of FIG. 10.

The K input of flip flop 502 is connected to +V, the Q output line of flip flop 502 is connected to the SSR output line which is connected to the reset of the slow scan counter 202 and the $\overline{Q}$ output line is connected to the S input of flip flop 504. Flip flop 504 has its J input line connected to ground, the C input line is connected to line SS2 which is the third stage output line of the slow scan counter. The $\overline{Q}$ output line of the flip flop 504 is connected to OR gate 506. The OR gate 506 is also connected to the RSC-FIN output line which is connected to the output of gate 234 in FIG. 11, the FS blanking line which is connected to the output of OR gate 452 of the fast scan control circuitry in FIG. 16 and the TFR-BLANK line which is connected to the $\overline{Q}$ output line of the compute flip flop 212 in FIG. 11.

AND gate 500 is enabled when the count of 280 is reached in the slow scan counter. When the AND gate 500 is enabled, it causes the flip flop 502 to be set at the end of the 280 feet scan line. When the flip flop 502 is set it causes flip flop 504 to be reset as the $\overline{Q}$ goes low. When the Q output line goes high it resets the slow scan counter 202 to zero. The setting of the flip flop 502 causes the setting of flip flop 504. The setting of flip flop 504 causes the $\overline{Q}$ output line to go low which thereby enables the OR gate 506. The output of Or gate 506 is connected to the cathode ray tube and a high signal thereon causes a blanking of the cathode ray tube. Thus the cathode ray tube is blank from the period of time that the slow scan counter reaches the count of 280 until the flip flop 504 is reset. The flip flop 504 is reset when the slow scan counter goes from the count of 7 to 8 thereby causing the SS2 output line thereof to go low. When the output line SS2 goes low it causes the flip flop 504 to be reset.

It should also be noted that the cathode ray tube is blank whenever any of the RSC-FIN, FS-BLANKING and TFR-BLANK lines go low. These have been explained above. The set input of the flop flop 502 is connected via a manual push-button switch 508 so that the push button is pressed to initiate a scanning. The flip flop 502 is set to cause the slow scan counter to be reset to zero to assure that the complete scan across the slow scan direction is initiated when operation of the system is started. The flop flop 502 remains set as long as the start push button is set and for the period required to complete a fast scan.

It can therefore be seen that a new and improved scanning system for the location and classification of patterns has been provided. The system facilitates the location of white blood cells by a unique pattern capture technique which avoids the necessity of looking at cells which are not of the same class as the white cells which are to be classified. The technique utilizes color, density and size information in order to filter out all of the patterns not required in the classification of white blood cells.

Another improved feature of the invention is the improved scanning system which uses a much faster speed in the slow scan direction for covering areas in order to locate a pattern which must be examined for classification. When a pattern of a specific class has been located, the scanner controls causes the cathode ray tube to progress more slowly over the pattern so that a greater number of samples can be taken in the area of the cell which is to be classified.

The window control system which is utilized herein also prevents undue wear of the cathode ray tube which is used to provide the flying slop scanner. By sampling only a portion of the area within the fast scan direction, increased voltage may be applied to the beam without causing undue wearing of the phosphor in a small area which would cause spotting in the face of the CRT.

The pattern capture control not only provides a gating system for extracting information pertaining only to white cells and therefore detecting the white cells but also provides a unique system to prevent recapturing the same white cell.

Without further elaboration, the foregoing will so fully illustrate our invention that others may, be applying current or future knowledge, readily adapt the same for use under various conditions of service.

What is claimed as the invention is:

1. A pattern recognition system having means for scanning a field, said field having a plurality of classes of patterns therein, said classes of patterns being of different color densities and sizes, said means for scanning traversing said field in a first direction in a fast scan and in a second direction in a slow scan, means responsive to said scanning means for generating a signal corresponding to the colors of said field at the positions scanned, detection means responsive to said signal for detecting when said means for scanning has reached the location of a pattern from one of said classes of patterns, said detection means including threshold means responsive to said signal for indicating when said signal represents a predetermined color density and, size discrimination means for determining whether a pattern is a predetermined size, said detection means detecting patterns from only one of said classes of patterns in accordance with the color, threshold density and size of said pattern, said scanning means traversing said second direction at a first speed until said detection means responsive to said signal detects said pattern from one of said classes of patterns, and control means responsive to said detection for backing up said scanning means in said second direction and causing said scanning means to traverse said pattern at a second speed slower than said first speed so that said pattern recognition system is required to examine for discrimination among the patterns only patterns of said one of said classes.

2. The system of claim 1 wherein said scanning in said second direction is controlled by a digital counter when said scanning means traverses at a first speed and said scanning means being controlled in said second direction by a ramp generator for traversing said second direction at said second speed.

3. A pattern recognition system having pattern recognition means for scanning a field, said field having a plurality of classes of patterns therein, said means for scanning traversing said field in a first direction in a fast scan and in a second direction in a slow scan, the length of said scan in said first direction being greater than the length of any pattern in said field, means responsive to said scanning means for generating a signal corresponding to the colors of said field at the positions scanned, serial storage means for receiving a binary quantization of the signal generated by said scanning means when said scanning means is moving in said slow scan direction at a first speed, detection means responsive to said serial storage means for detecting when said means for scanning has reached the location of a pattern from one of said classes of patterns, said scanning means traversing said second direction at a first speed until said detection means detects said pattern from one of said classes of patterns, and control means responsive to said detection for backing up said scanning means in said second direction and causing said scanning means to traverse said pattern at a second speed slower than said first speed, said system further including window control means responsive to said detection means to enable said storage means to receive the binary quantization of only a portion of said signal corresponding to the area of said field immediately surrounding and including said pattern.

4. The system of claim 3 and further including inhibiting means, said means for inhibiting including means for defining a plurality of areas of said scan along the length of said fast scan direction, and means responsive to said detection means for storing the area in which said pattern is detected, said means for inhibiting being connected to said detection means for inhibition further detection in the same area for a predetermined length in said slow scan direction and in said fast scan direction.

5. The system of claim 4 wherein said means for inhibiting further includes means for inhibiting detection in the adjacent areas on both sides of said area in which said pattern is detected.

6. The system of claim 5 and further including a serial storage register having a plurality of bits to represent each of said defined areas, means for recirculating said bits in said storage register once for each complete fast scan sweep when said scanning means is moving in said second direction at said first speed, means responsive to said storage register to enable said storage register to maintain a record of the specific area in which a cell has been detected and keep track of the number of times that said bits have completely recirculated through said register.

7. The system of claim 6 wherein said means responsive to said storage register further includes means for changing the bits which represent each area, said bits corresponding to a count of the number of times said bits have completely recirculated through said storage register, said bits being incremented by a count of one for each recirculation of said bits in said register.

8. The system of claim 3 wherein a fast scan counter is provided which is stepped at a predetermined rate in order to define the location along the fast scan direction that the sacnning means has traversed, and recycle means being connected to said fast scan counter for recycling said fast scan counter at a first count when said scanning means is moving in said slow scan direction at a first speed and recycling said fast scan counter at a second predetermined count when said scanning means is moving in said slow scan direction at said second speed.

9. The system of claim 8 wherein said storage means accepts said portion of said quantized signal during the period in said fast scan counter between said first and said second predetermined counts.

10. The system of claim 3 and further including means for sampling said signal at a predetermined rate when said beam is moving in said slow scan direction at a first speed and sampling said signal at a greater rate of speed when said scanning means moves in said slow scan direction at said second speed.

11. A white blood cell classification system for detecting and classifying white blood cells in a peripheral blood smear, said system including means for scanning fields in the blood smear, said means for scanning having a search mode to find white cells in said smear and a rescan mode for classification of said white cells, means responsive to said scanning means for generating signals corresponding to the colors of said field at the positions scanned, said means responsive including filtering means for dividing the signals corresponding to the color into a plurality of the spectral bands, color processing means responsive to said signals for reducing information in said signals relating to red cells and providing a signal representative of the relative darkness of said area scanned and quantizing means responsive to said color processing means for generating a quantized signal, said quantizing means having a threshold level which is normally exceeded only by the nucleus of a white cell or a platelet, and detection means responsive to said quantized signal during said search mode of said means for scanning, said detection means including a mask which will normally be enabled by the nucleus of all the white cells, but which will not be enabled by a platelet or foreign material in the blood smear, said scanning means being responsive to said detection means, said scanning means being caused to switch to its rescan mode to rescan the area of said smear where a pattern is located which causes said mask to be enabled so that only said white cells are rescanned for classification.

12. The system of claim 11 wherein said mask, in order to be enabled, requires a quantized signal representative of an area approximately one micron wide and two microns long.

13. The system of claim 11 wherein said mask is enabled by a quantized signal representative of a Y shaped area.

* * * * *

UNITED STATES PATENT OFFICE

CERTIFICATE OF CORRECTION

Patent No. 3,873,974 Dated March 25, 1975

Inventor(s) John C. Bouton and Melvin E. Partin

It is certified that error appears in the above-identified patent and that said Letters Patent are hereby corrected as shown below:

Column 4, line 47 "shaft" should be -- shift--.

Column 6, line 15 "initiatees" should be --initiates--.

Column 6 line 16 delete the word "initiates" and substitute thereof -- control--.

Column 7 line 19 "the" (first occurrence) should be --to--.

Column 7. line 44 "that" should be --there--.

Column 8, line 62 after the word "shift" insert --register--.

Column 13, line 42 "flip" (second occurrence) should be --flop--.

Column 16, line 4 "treshold" should be --threshold--.

Column 21, line 47 delete "20 fourth" and insert therefor --24--.

Signed and sealed this 20th day of May 1975.

(SEAL)
Attest:

RUTH C. MASON
Attesting Officer

C. MARSHALL DANN
Commissioner of Patents
and Trademarks

ORM PO-1050 (10-69)

USCOMM-DC 60376-P69
U.S. GOVERNMENT PRINTING OFFICE 869-930